(12) United States Patent
Tanaka et al.

(10) Patent No.: US 10,284,831 B2
(45) Date of Patent: May 7, 2019

(54) PROJECTION SYSTEM, PROJECTOR APPARATUS, IMAGE CAPTURING APPARATUS, AND PROJECTION METHOD

(71) Applicants: MegaChips Corporation, Osaka-shi (JP); Nintendo Co., Ltd., Kyoto-shi (JP)

(72) Inventors: Motoyasu Tanaka, Osaka (JP); Yuki Haraguchi, Chiba (JP); Fumiya Shingu, San Jose, CA (US); Eizi Kawai, Kyoto (JP); Kazuhiro Hosoi, Kyoto (JP)

(73) Assignees: MEGACHIPS CORPORATION, Osaka (JP); NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/707,181

(22) Filed: Sep. 18, 2017

(65) Prior Publication Data
US 2018/0007329 A1     Jan. 4, 2018

Related U.S. Application Data

(63) Continuation of application No. PCT/JP2016/053245, filed on Feb. 3, 2016.

(30) Foreign Application Priority Data

Mar. 19, 2015  (JP) ................ 2015-056608

(51) Int. Cl.
*H04N 9/31* (2006.01)
*G09G 5/00* (2006.01)
(Continued)

(52) U.S. Cl.
CPC .......... *H04N 9/3185* (2013.01); *G01B 11/24* (2013.01); *G01B 11/25* (2013.01);
(Continued)

(58) Field of Classification Search
CPC .. H04N 9/3185; H04N 9/3184; H04N 5/2628; G06T 5/006; G06T 2207/10016
See application file for complete search history.

(56) References Cited

U.S. PATENT DOCUMENTS

| 6,416,186 B1 * | 7/2002 | Nakamura | ............... H04N 5/74 |
| | | | 348/E5.137 |
| 6,709,116 B1 * | 3/2004 | Raskar | ................... G01B 11/25 |
| | | | 348/E5.137 |

(Continued)

FOREIGN PATENT DOCUMENTS

| EP | 2 824 923 A1 | 1/2015 |
| JP | 2001-61121 | 3/2001 |

(Continued)

OTHER PUBLICATIONS

Extended European Search Report dated Jan. 15, 2018 in Patent Application No. 16764562.1.

(Continued)

*Primary Examiner* — Brian P Yenke
(74) *Attorney, Agent, or Firm* — XSensus LLP

(57) ABSTRACT

Provided is a projection system that sets an arbitrary three-dimensional shape as a projection target and properly corrects geometric distortion of a projected image even when a user's viewpoint is not fixed. A projection unit of the projector apparatus projects a test image for first adjustment. A three-dimensional shape measurement unit measures the three-dimensional shape of the projection target. An image capturing apparatus captures the test image for first adjustment projected by the projection unit to obtain a captured image for first adjustment. A projected image adjustment unit (1) performs first adjustment processing for correcting an image such that geometric image distortion viewed from an imaging point, at which the captured image for first adjustment has been captured, is reduced, based on a cap- (Continued)

tured image for first adjustment obtained by the image capturing apparatus, and (2) performs second adjustment processing for correcting the image such that the geometric image distortion is reduced based on a state in which the image adjusted by the first adjustment processing is projected by the projection unit.

14 Claims, 18 Drawing Sheets

(51) Int. Cl.
  *G09G 5/36* (2006.01)
  *G09G 3/00* (2006.01)
  *G01B 11/24* (2006.01)
  *G01B 11/25* (2006.01)

(52) U.S. Cl.
  CPC ......... *G01B 11/2513* (2013.01); *G09G 3/001* (2013.01); *G09G 5/00* (2013.01); *G09G 5/36* (2013.01); *H04N 9/3194* (2013.01)

(56) References Cited

U.S. PATENT DOCUMENTS

| | | | | |
|---|---|---|---|---|
| 8,272,748 | B2 * | 9/2012 | Furui | G03B 21/26 353/70 |
| 9,064,321 | B2 * | 6/2015 | Walker | G01S 7/52046 |
| 9,524,578 | B2 * | 12/2016 | Fuchikami | G06T 15/20 |
| 9,532,020 | B2 | 12/2016 | Hara | |
| 9,595,106 | B2 * | 3/2017 | Hara | G06T 5/002 |
| 9,661,257 | B2 * | 5/2017 | Ishikawa | G06T 3/005 |
| 9,672,602 | B2 * | 6/2017 | Hara | G06T 5/006 |
| 9,678,413 | B2 * | 6/2017 | Furui | G03B 21/53 |
| 9,772,496 | B2 * | 9/2017 | Kimura | G02B 27/0179 |
| 9,774,837 | B2 * | 9/2017 | Chang | H04N 9/3191 |
| 9,786,064 | B2 * | 10/2017 | Um | H04N 5/2258 |
| 9,928,580 | B2 * | 3/2018 | Tanaka | H04N 9/3185 |
| 2001/0019358 | A1 | 9/2001 | Waki et al. | |
| 2005/0179875 | A1 * | 8/2005 | Aoyanagi | G03B 5/02 353/101 |
| 2009/0097039 | A1 * | 4/2009 | Kawasaki | G01B 11/2509 356/603 |
| 2009/0115916 | A1 | 5/2009 | Kondo et al. | |
| 2009/0161945 | A1 * | 6/2009 | Morgan-Mar | G06K 9/3216 382/154 |
| 2010/0128231 | A1 * | 5/2010 | Furui | G03B 21/26 353/70 |
| 2013/0120362 | A1 * | 5/2013 | Harris | H04N 13/0459 345/419 |
| 2014/0055568 | A1 * | 2/2014 | Etzold | G01B 11/16 348/46 |
| 2014/0063192 | A1 * | 3/2014 | Sonoda | G01B 11/2513 348/46 |
| 2014/0267246 | A1 * | 9/2014 | Suzuki | G01B 11/2513 345/419 |
| 2014/0267427 | A1 * | 9/2014 | Hasegawa | G06T 5/006 345/647 |
| 2014/0267624 | A1 * | 9/2014 | Hara | G01B 11/2504 348/46 |
| 2014/0320605 | A1 * | 10/2014 | Johnson | G01B 11/2513 348/47 |
| 2015/0015699 | A1 | 1/2015 | Vieth et al. | |
| 2015/0029465 | A1 * | 1/2015 | Ishikawa | G06T 3/005 353/30 |
| 2015/0077573 | A1 * | 3/2015 | Ishikawa | G06T 3/005 348/189 |
| 2015/0193915 | A1 * | 7/2015 | Shinde | G06T 5/006 345/625 |
| 2015/0204661 | A1 * | 7/2015 | Sonoda | G06T 7/521 356/610 |
| 2015/0237269 | A1 * | 8/2015 | Hesch | H04N 5/2628 348/218.1 |
| 2015/0254819 | A1 * | 9/2015 | Hara | G06T 5/006 345/647 |
| 2015/0310613 | A1 * | 10/2015 | Murakami | G02B 21/365 382/128 |
| 2015/0319415 | A1 | 11/2015 | Hara | |
| 2015/0348313 | A1 * | 12/2015 | Fuchikami | G06T 15/20 348/333.01 |
| 2015/0350618 | A1 | 12/2015 | Meier et al. | |
| 2016/0034746 | A1 * | 2/2016 | Harada | G06K 9/00201 382/154 |
| 2016/0132991 | A1 * | 5/2016 | Fukushi | A63F 13/5255 345/667 |
| 2017/0078631 | A1 * | 3/2017 | Fuchikami | G06T 15/20 |
| 2017/0237909 | A1 * | 8/2017 | Miki | H04N 5/2628 348/239 |
| 2017/0363936 | A1 * | 12/2017 | Yamahara | G03B 21/001 |
| 2017/0374332 | A1 * | 12/2017 | Yamaguchi | G06T 7/74 |
| 2018/0007329 | A1 | 1/2018 | Tanaka et al. | |
| 2018/0018761 | A1 * | 1/2018 | Tanaka | H04N 9/3185 |
| 2018/0101962 | A1 * | 4/2018 | Takizawa | G06T 7/521 |

FOREIGN PATENT DOCUMENTS

| | | |
|---|---|---|
| JP | 2001-251651 | 9/2001 |
| JP | 2003-348500 | 12/2003 |
| JP | 2005-354232 | 12/2005 |
| JP | 2006-33357 | 2/2006 |
| JP | 2006-128875 | 5/2006 |
| JP | 2010-171774 | 8/2010 |
| JP | 2010-283674 | 12/2010 |
| JP | 2016-178448 A | 10/2016 |
| WO | WO 2014/101955 A1 | 7/2014 |
| WO | WO 2014/104383 A1 | 7/2014 |
| WO | WO 2016/147731 A1 | 9/2016 |

OTHER PUBLICATIONS

Office Action dated Feb. 14, 2018 in European Patent Application No. 16 764 562.1.

International Search Report dated Apr. 19, 2016 in PCT/JP2016/053245, filed on Feb. 3, 2016.

European Office Action dated Oct. 1, 2018 in European Application No. 16764562.1.

\* cited by examiner

PROJECTION SYSTEM, PROJECTOR APPARATUS, IMAGE CAPTURING APPARATUS, AND PROJECTION METHOD

TECHNICAL FIELD

The present invention relates to a technique for appropriately displaying an image (video) projected by a projection-type projector apparatus.

BACKGROUND ART

Various techniques have been developed for correcting geometric distortion that occurs when an image (video) projected by a projection-type projector apparatus is viewed from a user's viewpoint.

For example, a video projection apparatus capable of correcting image distortion due to the distortion of a screen itself is known. Such a video projection apparatus projects a test image from a projector onto the screen, captures the projected test image with a camera-equipped cellular phone, and performs geometric correction based on the image captured by the camera-equipped cellular phone. This allows the video projection apparatus to correct distortion(s) (geometric distortion(s)) of the video due to the distortion of the screen itself.

DISCLOSURE OF INVENTION

Technical Problem

However, the above-described conventional technique is assumed to use a screen as a projection target; thus, it is difficult to properly correct image distortion (geometric distortion) using the above technique when a complicated three-dimensional shape is set as the projection target. In other words, the above-described conventional technique is assumed to use a substantially flat surface as the projection target, thus making it difficult to properly correct image distortion (geometric distortion) such that the geometric distortion of an image (video), which is perceived when viewed from the user's viewpoint, is reduced when a complicated three-dimensional shape is set as the projection target.

Alternatively, it may be conceivable that three-dimensional shape data of a projection target is obtained by measuring the three-dimensional shape of the projection target, and then correction processing for obtaining a projected image whose geometric distortion, which is perceived when viewed from the user's viewpoint, is reduced is performed using the obtained the three-dimensional shape of the projection target.

In this case, it is necessary to accurately specify the viewpoint position of the user. Accordingly, if the accuracy for specifying the viewpoint position of the user is low, geometric distortion of the projected image cannot be properly corrected. Thus, when the viewpoint position of the user is not fixed, it is difficult to accurately specify the viewpoint position of the user at all times; accordingly, it is difficult to properly correct geometric distortion of the projected image using the above technique.

In response to the above problems, it is an object of the present invention to provide a projector apparatus that sets an arbitrary three-dimensional shape as a projection target and properly corrects geometric distortion of a projected image even when a user's viewpoint is not fixed.

Solution to Problem

To solve the above problems, a first aspect of the invention provides a projection system that sets any shape as a projection target and projects an image onto the projection target such that geometric distortion of the projected image as viewed from a user's viewpoint is reduced. The projection system includes a projection unit, a three-dimensional shape measurement unit, an imaging unit, and a projected image adjustment unit.

The projection unit, which is located at a first position, is configured to project an image onto the projection target, and the projection unit projects a test image for first adjustment.

The three-dimensional shape measurement unit is configured to measure a three-dimensional shape of the projection target.

The imaging unit is configured to capture the test image for first adjustment projected from the projection unit to obtain a captured image for first adjustment

DESCRIPTION OF THE PREFERRED EMBODIMENTS

First Embodiment

A first embodiment will now be described with reference to the drawings.

1.1 Structure of Projection System

Figure 1:
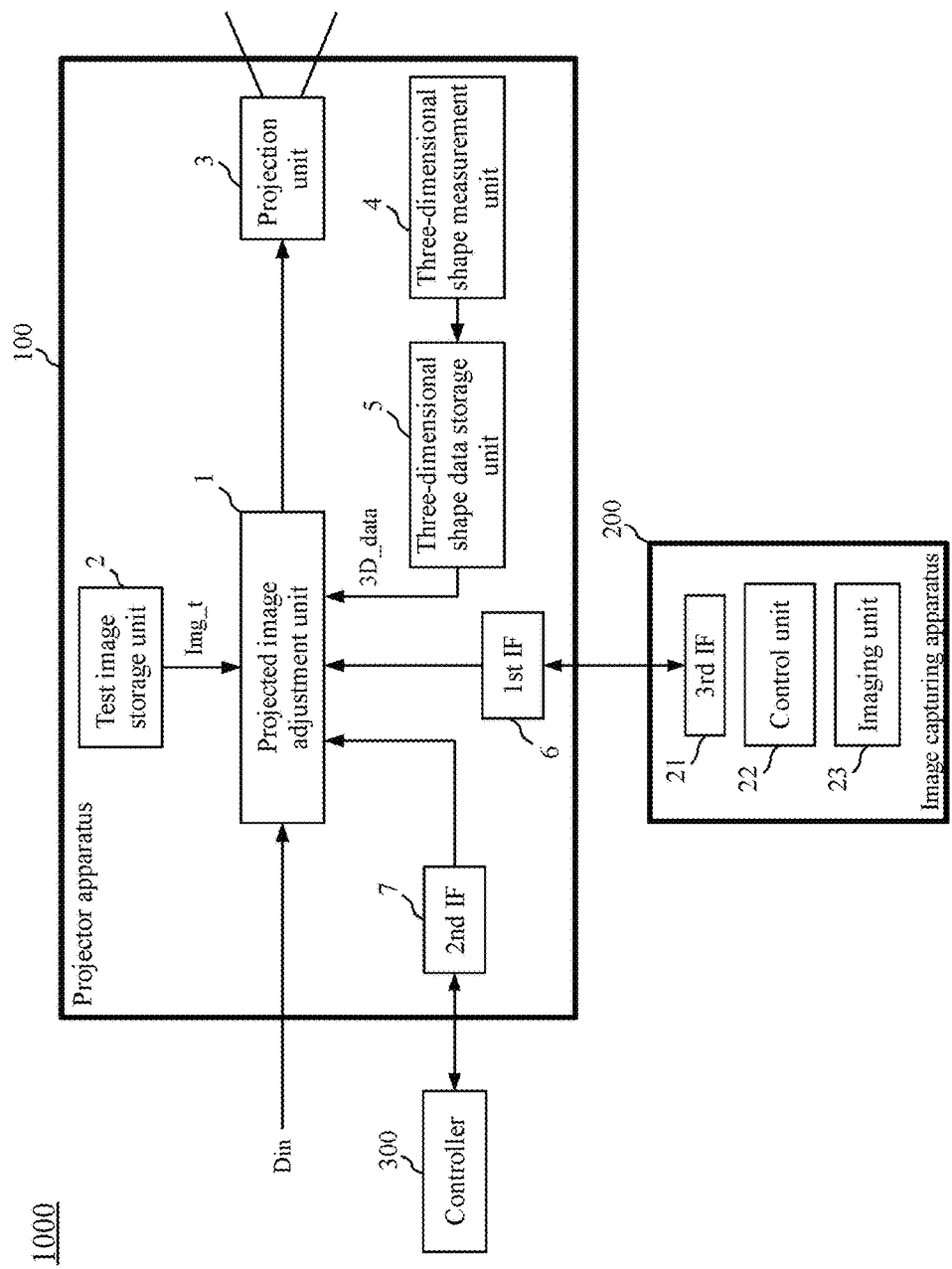
FIG. 1 is a schematic diagram showing the structure of a projection system 1000 according to a first embodiment.

FIG. 1 is a schematic diagram showing the structure of a projection system 1000 according to the first embodiment.

Figure 2:
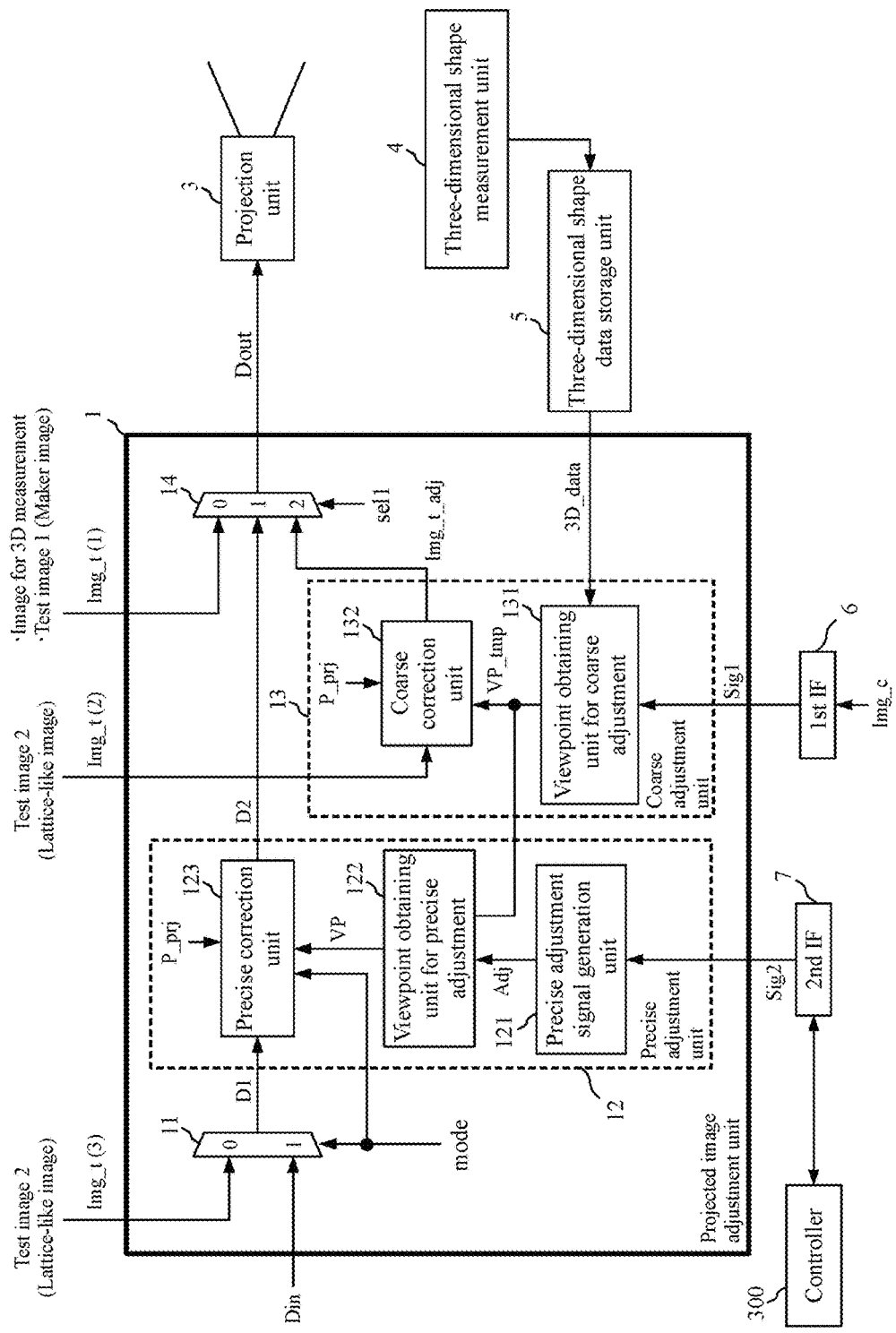
FIG. 2 is a schematic diagram showing the structure of a projected image adjustment unit 1 of a projector apparatus 100 of the projection system 1000 according to the first embodiment.

FIG. 2 is a schematic diagram showing the structure of a projected image adjustment unit 1 of a projector apparatus 100 of the projection system 1000 according to the first embodiment.

As shown in FIG. 1, the projection system 1000 includes a projector apparatus 100, an image capturing apparatus 200, and a controller 300.

As shown in FIG. 1, the projector apparatus 100 includes a projected image adjustment unit 1, a test image storage unit 2, a projection unit 3, a three-dimensional shape measurement unit 4, a three-dimensional shape data storage unit 5, a first interface 6, and a second interface 7.

As shown in FIG. 2, the projected image adjustment unit 1 includes a first selector 11, a precise adjustment unit 12, a coarse adjustment unit 13, and a second selector 14.

The first selector 11 receives a test image (test image for precise adjustment) Img_t(3) transmitted from the test image storage unit 2, an input image Din, and a mode signal mode. Based on the mode signal mode, the first selector 11 selects either the test image (test image for precise adjustment) Img_t(3) transmitted from the test image storage unit 2 or the input image Din, and then transmits the selected image as an image D1 (image signal D1) to the precise adjustment unit 12.

Note that the test image Img_t transmitted from the test image storage unit 2 to the projected image adjustment unit 1 is referred to as an image Img_t(1) when the test image is transmitted to the second selector 14, and is referred to as an image Img_t(2) when the test image is transmitted to the coarse adjustment unit 13, and is referred to as an image Img_t(3) when the test image is transmitted to the first selector 11 (the same applies hereinafter).

As shown in FIG. 2, the precise adjustment unit 12 includes a precise adjustment signal generation unit 121, a viewpoint obtaining unit 122 for precise adjustment, and a precise correction unit 123.

The precise adjustment signal generation unit 121 receives the signal Sig2 transmitted from the second interface 7 and then generates a precise adjustment signal Adj based on the received signal Sig2. The precise adjustment signal generation unit 121 then transmits the generated precise adjustment signal Adj to the viewpoint obtaining unit 122 for precise adjustment.

The viewpoint obtaining unit 122 for precise adjustment receives the precise adjustment signal Adj transmitted from the precise adjustment signal generation unit 121 and a signal VP_tmp including the information on a viewpoint for coarse adjustment transmitted from the viewpoint obtaining unit 131 for coarse adjustment included in the coarse adjustment unit 13. The viewpoint obtaining unit 122 for precise adjustment obtains a signal VP including viewpoint information based on the signal VP_tmp and the precise adjustment signal Adj. The viewpoint obtaining unit 122 for precise adjustment transmits the obtained signal VP to the precise correction unit 123.

The precise correction unit 123 receives the image signal D1 transmitted from the first selector 11, the signal VP including the viewpoint information transmitted from the viewpoint obtaining unit 122 for precise adjustment, the mode signal mode, and information P_prj on the projection point of the projection unit 3. The precise correction unit 123 performs precise correction processing on the image signal D1 based on the mode signal mode, the information P_prj on the projection point of the projection unit 3, and the signal VP including viewpoint information to obtain a processed image signal D2 (details will be described later). The precise correction unit 123 transmits the obtained image signal D2 to the second selector 14. Note that the information P_prj on the projection point of the projection unit 3 is, for example, information indicating coordinates (e.g., coordinates (x1, y1, z1)) of the projection point of the projection unit 3 in a three-dimensional space (e.g., a three-dimensional space defined by the x-axis, the y-axis, and the z-axis). Information P_prj on the projection point of the projection unit 3 is specified by setting the projector apparatus 100 at a predetermined position. Alternatively, the information P_prj on the projection point of the projection unit 3 may be specified by performing calibration using a three-dimensional measurement apparatus in advance and setting the projection point of the projection unit 3 as the origin.

As shown in FIG. 2, the coarse adjustment unit 13 includes a viewpoint obtaining unit 131 for coarse adjustment and a coarse correction unit 132.

The viewpoint obtaining unit 131 for coarse adjustment accesses the three-dimensional shape data storage unit 5 and receives the three-dimensional shape data 3D_data from the three-dimensional shape data storage unit 5. In addition, the viewpoint obtaining unit 131 for coarse adjustment receives the signal Sig1 (=the image signal Img_c) transmitted from the first interface 6. The viewpoint obtaining unit 131 for coarse adjustment calculates a viewpoint for coarse adjustment based on the signal Sig1 (=the image signal Img_c) and the three-dimensional shape data 3D_data to generate the signal VP_tmp including information on the calculated viewpoint for coarse adjustment. The viewpoint obtaining unit 131 for coarse adjustment transmits the generated signal VP_tmp to the coarse correction unit 132 and the viewpoint obtaining unit 122 for precise adjustment.

The coarse correction unit 132 receives the signal VP_tmp transmitted from the viewpoint obtaining unit 131 for coarse adjustment, the test image Img_t(2) transmitted from the test image storage unit 2, and the information P_prj on the projection point of the projection unit 3. The coarse correction unit 132 performs coarse correction processing on the test image Img_t(2) based on the information P_prj on the projection point and the signal VP_tmp including information on the viewpoint for coarse adjustment to obtain an image signal Img_t_adj. The coarse correction unit 132 then transmits the obtained image signal Img_t_adj to the second selector 14.

The second selector 14 receives the test image Img_t(1) (image signal Img_t(1)) transmitted from the test image storage unit 2, the image signal D2 transmitted from the precise correction unit 123, the image signal Img_t_adj transmitted from the coarse correction unit 132, and a selection signal sel1. The second selector 14 selects one of the image signal Img_t(1), the image signal D2, and the image signal Img_t_adj in accordance with the selection signal sel1, and then transmits the selected signal, as the image signal Dout, to the projection unit 3.

The test image storage unit 2 stores the test image, and transmit the test image to the projected image adjustment unit 1 at a predetermined timing in accordance with a request from the projected image adjustment unit 1.

The projection unit 3 includes an optical system for projecting an image. The projection unit 3 receives the image signal Dout transmitted from the second selector 14 of the projected image adjustment unit 1 and then projects the received image signal Dout onto the projection target in the three-dimensional space.

The three-dimensional shape measurement unit 4 obtains three-dimensional measurement data of the projection target in the three-dimensional space, and then transmits the obtained three-dimensional measurement data of the projection target to the three-dimensional shape data storage unit 5. The three-dimensional shape measurement unit 4 includes, for example, a camera, captures a test image for three-dimensional shape measurement, which is projected from the projection unit 3, and obtains the three-dimensional measurement data of the projection target based on the captured image of the test image for three-dimensional shape measurement.

Alternatively, the three-dimensional shape measurement unit 4 may obtain the three-dimensional measurement data of the projection target by obtaining a range image using the TOF (Time Of Flight) method (e.g., the TOF method using phase differences).

In this case, the three-dimensional shape measurement unit 4 includes, for example, a light source for emitting infrared rays and an image sensor for infrared rays, and receives the reflected light of the infrared ray irradiated from the light source with the image sensor and measures a time period from when the infrared ray is irradiated to when the irradiated infrared ray is reflected at the projection target and returns to the light source, thereby obtaining a range image. The three-dimensional shape measurement unit 4 then obtains three-dimensional measurement data of the projection target from the obtained range image.

As further alternative, the three-dimensional shape measurement unit 4 includes a laser light source and a sensor for laser and measures a distance from the laser light source to the projection target based on the flight time of the laser light to obtain three-dimensional measurement data of the projection target. In this case, the three-dimensional shape measurement unit 4 irradiates the laser light to the projection target while sequentially changing the irradiation direction (while scanning the projection target with the laser light), and measure a time period from when the infrared laser light is irradiated to when the irradiated laser light is reflected at the projection target and returns to the laser light source, thereby obtaining three-dimensional measurement data of the projection target.

The three-dimensional shape data storage unit 5 receives the three-dimensional measurement data of the projection target obtained by the three-dimensional shape measurement unit 4, and stores the received three-dimensional measurement data of the input projection target. The three-dimensional shape data storage unit 5 transmits three-dimensional measurement data to the viewpoint obtaining unit 131 for coarse adjustment in accordance with a request from the viewpoint obtaining unit 131 for coarse adjustment of the coarse adjustment unit 13.

The first interface 6 is an interface between the projector apparatus 100 and the image capturing apparatus 200. Via the first interface 6, an image (image signal) obtained by the image capturing apparatus 200 through image capturing can be transmitted to the projector apparatus 100.

The second interface 7 is an interface between the projector apparatus 100 and the controller 300. Via the second interface 7, a signal from the controller 300 can be transmitted to the projector apparatus 100.

As shown in FIG. 1, the image capturing apparatus 200 includes a third interface 21, a control unit 22, and an imaging unit 23. The image capturing apparatus 200 is achieved by using a camera-equipped mobile phone or a camera-equipped smartphone, for example. The image capturing apparatus 200 may be a portable information terminal with an image capturing function.

The third interface 21 is an interface between the image capturing apparatus 200 and the projector apparatus 100.

The control unit 22 is for controlling each function unit of the image capturing apparatus 200.

The imaging unit 23 includes an optical system and an image sensor. The imaging unit 23 can capture an image projected onto the projection target from the projector apparatus 100, for example.

The controller 300 is a device for adjusting the geometric distortion of the image projected onto the projection target from the projector apparatus 100 by a user. The controller 300 generates an instruction signal based on the user's operation and transmits the instruction signal to the projector apparatus 100 via the second interface 7 of the projector apparatus 100.

1.2 Operation of Projection System

The operation of the projection system 1000 with the above-described structure will now be described.

For operations performed in the projection system 1000, (1) three-dimensional shape measurement processing, (2) coarse adjustment processing (first adjustment processing), and (3) precise adjustment processing (second adjustment processing) will now be described separately.

Figure 3:
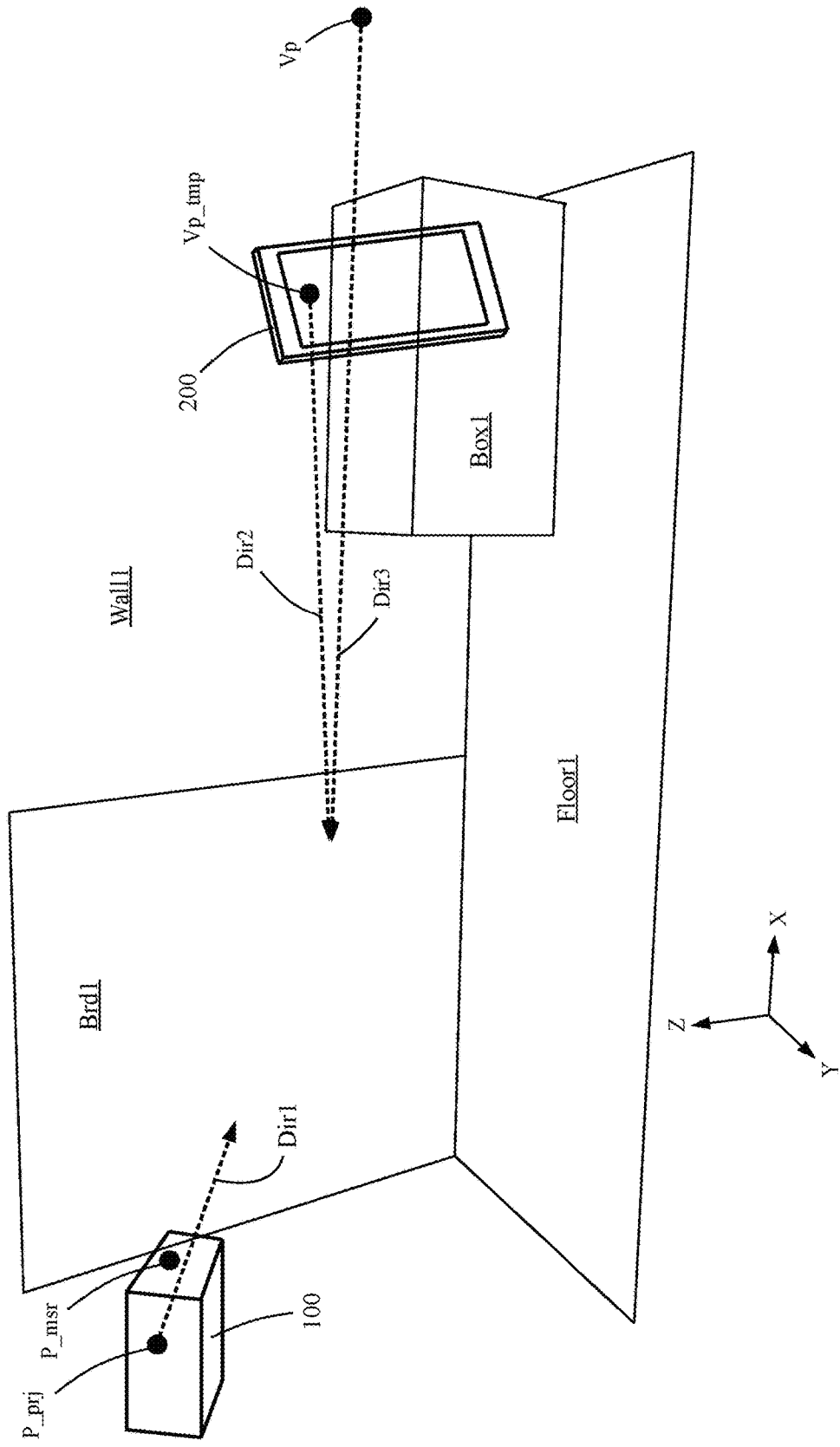
FIG. 3 is a diagram schematically showing a projection target, the projector apparatus 100, and an image capturing apparatus 200 (a camera-equipped smartphone) in a three-dimensional space.
Figure 4:
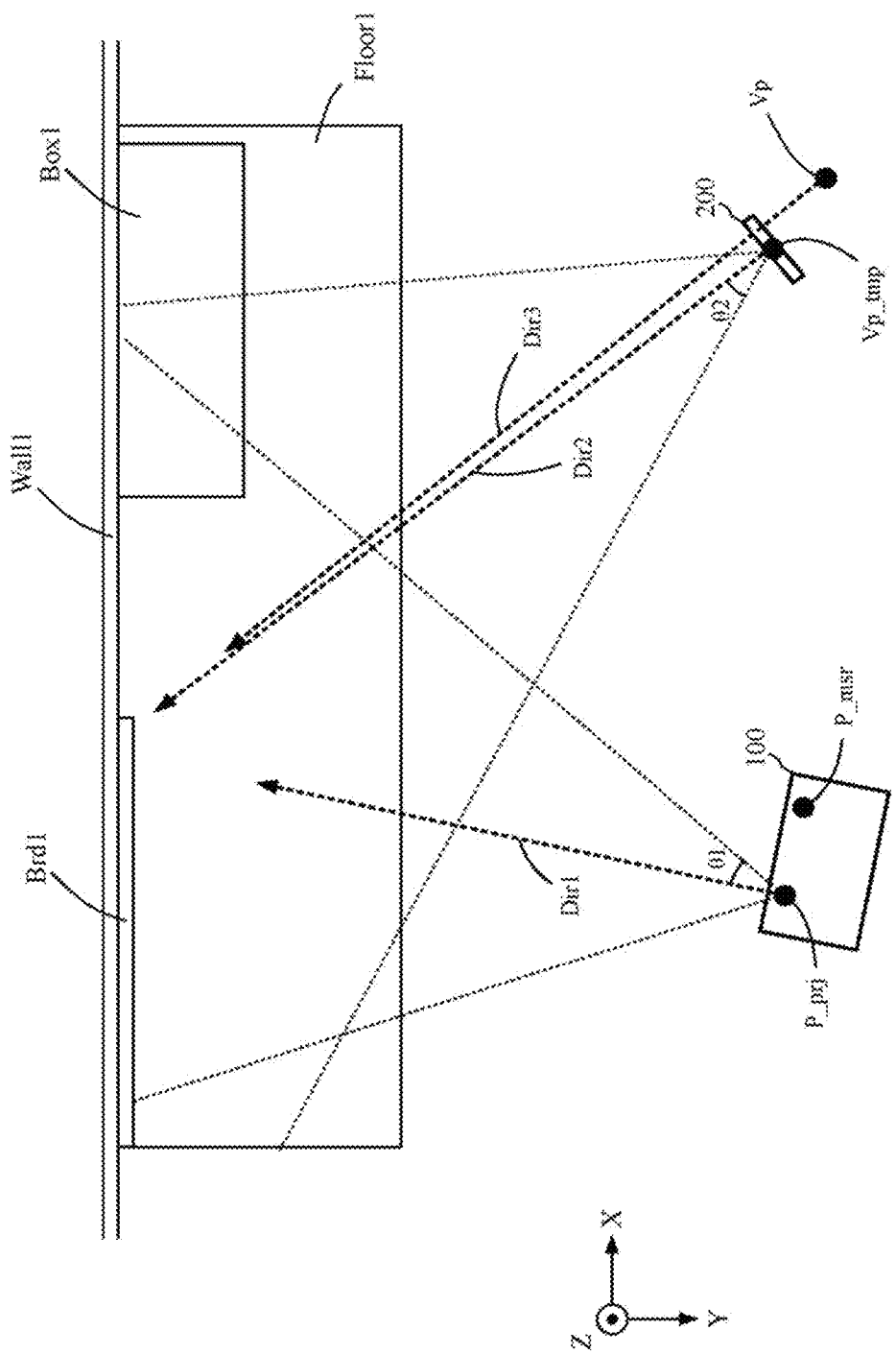
FIG. 4 is a view of the three-dimensional space shown in FIG. 3 as viewed from above.

For ease of explanation, a case in which the projection system 1000 operates assuming that a three-dimensional space shown in FIGS. 3 and 4 is set as a projection target will be described.

FIG. 3 is a diagram schematically showing a projection target, a projector apparatus 100, and an image capturing apparatus 200 (a camera-equipped smartphone) in a three-dimensional space. In the three-dimensional space shown in FIG. 3, a floor Floor1, a wall Wall1, a board Brd1, and a box Box1 are arranged as shown in FIG. 3. In FIG. 3, the projection point of the projection unit 3 of the projector apparatus 100 is indicated as a point P_prj, and the measurement point of the three-dimensional shape measurement unit 4 of the projector apparatus 100 is indicated as a point P_msr. Further, in FIG. 3, the image capturing point of the imaging unit 23 of the image capturing apparatus 200 is indicated as a point Vp_tmp, and the viewpoint position of a user (the center point of both eyes of the user) is indicated as a point Vp.

Note that the X-axis, the Y-axis, and the Z-axis are set as shown in FIG. 3.

FIG. 4 is a view of the three-dimensional space shown in FIG. 3 as viewed from above.

1.2.1 Three-dimensional Shape Measurement Processing

First, the three-dimensional shape measurement processing will be described.

A case will now be described in which in the projection system 1000, the three-dimensional shape measurement unit 4 includes a camera, captures a test image for three-dimensional shape measurement projected from the projection unit 3, and obtains three-dimensional measurement data of the projection target based on the captured image of the test image for three-dimensional shape measurement.

The test image Img_t(1) for three-dimensional shape measurement is transmitted from the test image storage unit 2 to the second selector 14 of the projected image adjustment unit 1. The projected image adjustment unit 1 then generates a selection signal sel1 for selecting the terminal 0 shown in FIG. 2 of the second selector 14, and transmitted the generated signal to the second selector 14. This causes the test image Img_t(1) for three-dimensional shape measurement to be transmitted from the second selector 14 to the projection unit 3 as the image signal Dout.

The projection unit 3 (A) sets the projection axis (the optical axis of the optical system of the projection unit 3) to the direction Dir1 shown in FIGS. 3 and 4, (B) sets the angle of view to an angel of θ1 shown in FIG. 4, (C) sets a projection point to the point P_prj shown in FIGS. 3 and 4, and then projects the test image Img_t(1) for three-dimensional shape measurement into the projection target.

The three-dimensional shape measurement unit 4 captures the test image Img_t(1) for three-dimensional shape measurement projected by the projection unit 3 using a camera for three-dimensional shape measurement whose image capturing point is at the point P_msr. The three-dimensional shape measurement unit 4 compares the captured image with the test image Img_t(1) for three-dimensional shape measurement to obtain three-dimensional measurement data of the projection target.

In the projection system 1000, the coordinates, in the three-dimensional space, of the projection point P_prj are known, the coordinates, in the three-dimensional space, of the imaging point P_msr of the three-dimensional shape measurement unit 4 are known, and the test image Img_t(1) for three-dimensional shape measurement to be projected is also known; therefore, the coordinates, in the three-dimensional space, of the projection target can be calculated from the captured image at the image capturing point P_msr. In other words, examining which pixel in the captured test image Img_t(1) for three-dimensional shape measurement corresponds to which pixel in the captured image at the image capturing point P_msr allows for determining the position, in the three-dimensional space, corresponding to each pixel (the position, in the three-dimensional space, at which light corresponding to each pixel is reflected). Thus, specifying the three-dimensional spatial position corresponding to each pixel allows for calculating the coordinates, in the three-dimensional space, of the projection target.

Note that the test image Img_t(1) for three-dimensional shape measurement may be, for example, an image formed by a sine wave signal with a predetermined cycle. In this case, for example, a plurality of images obtained by changing the cycle and phase of a sinusoidal signal at a predetermined timing may be projected from the projection unit 3 onto the projection target, and the three-dimensional shape measurement unit 4 may obtain the three-dimensional shape data of the projection target based on the plurality of projected images.

The three-dimensional shape data of the projection target obtained by the three-dimensional shape measurement unit 4 through the above processing is transmitted from the three-dimensional shape measurement unit 4 to the three-dimensional shape data storage unit 5 and then is stored in the three-dimensional shape data storage unit 5.

1.2.2 Coarse Adjustment Processing

Next, coarse adjustment processing will be described.

The test image Img_t(1) for coarse adjustment is transmitted from the test image storage unit 2 to the second selector 14 of the projected image adjustment unit 1. The projected image adjustment unit 1 then generates a selection signal sel1 for selecting the terminal 0 shown in FIG. 2 of the second selector 14, and transmits the selection signal to the second selector 14. This causes the coarse adjustment test image Img_t(1) to be transmitted from the second selector 14 to the projection unit 3 as the image signal Dout.

The projection unit 3 (A) sets the projection axis (the optical axis of the optical system of the projection unit 3) to the direction Dir1 shown in FIGS. 3 and 4, (B) sets the angle of view to an angel of θ1 shown in FIG. 4, (C) sets a projection point to the point P_prj shown in FIGS. 3 and 4, and then projects the test image Img_t(1) for coarse adjustment into the projection target.

A case in which the coarse adjustment test image Img_t(1) is an image having markers at the four corners will now be described.

Figure 5:
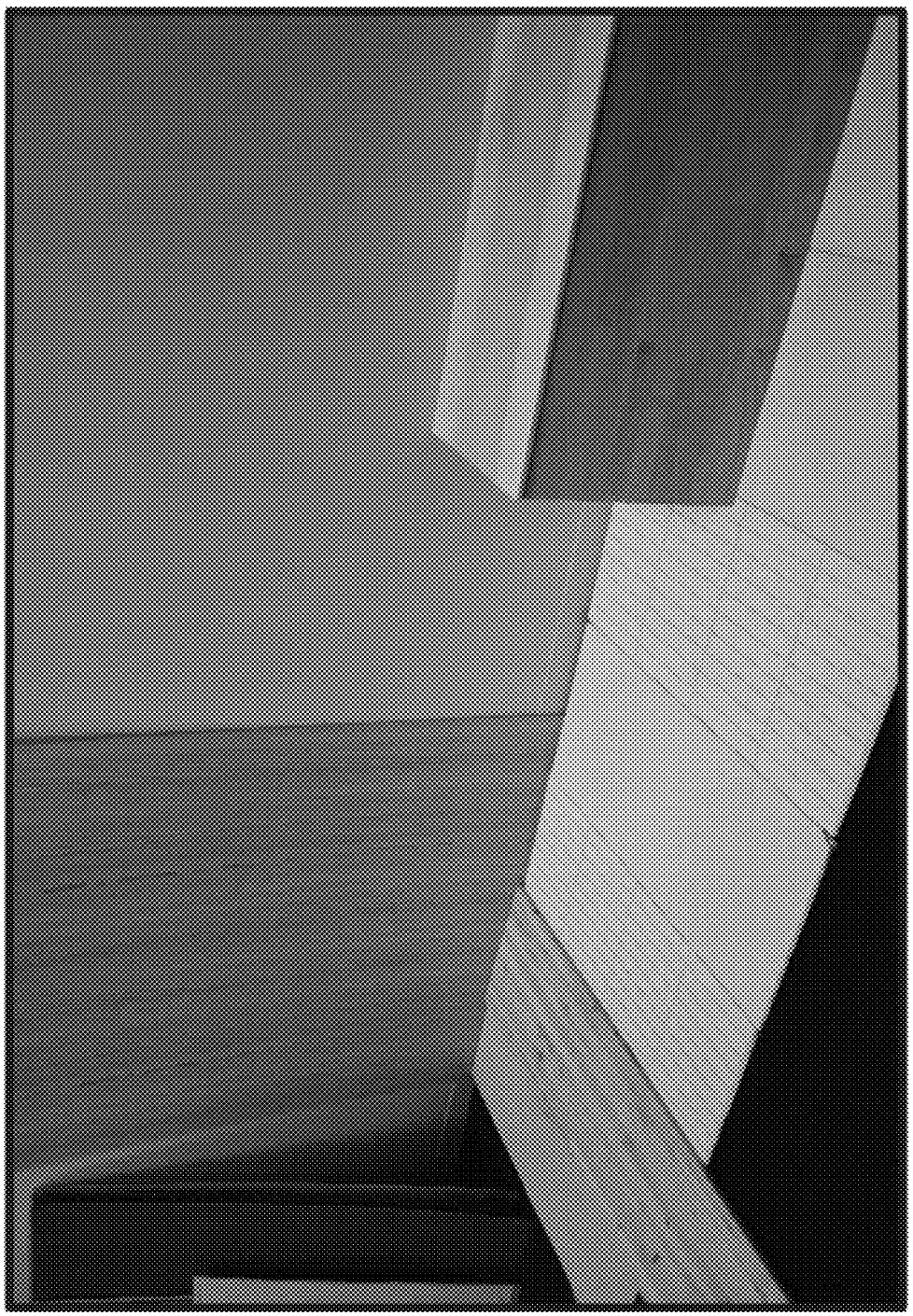
FIG. 5 shows an actual image of the projection target schematically shown in FIGS. 3 and 4.
Figure 6:
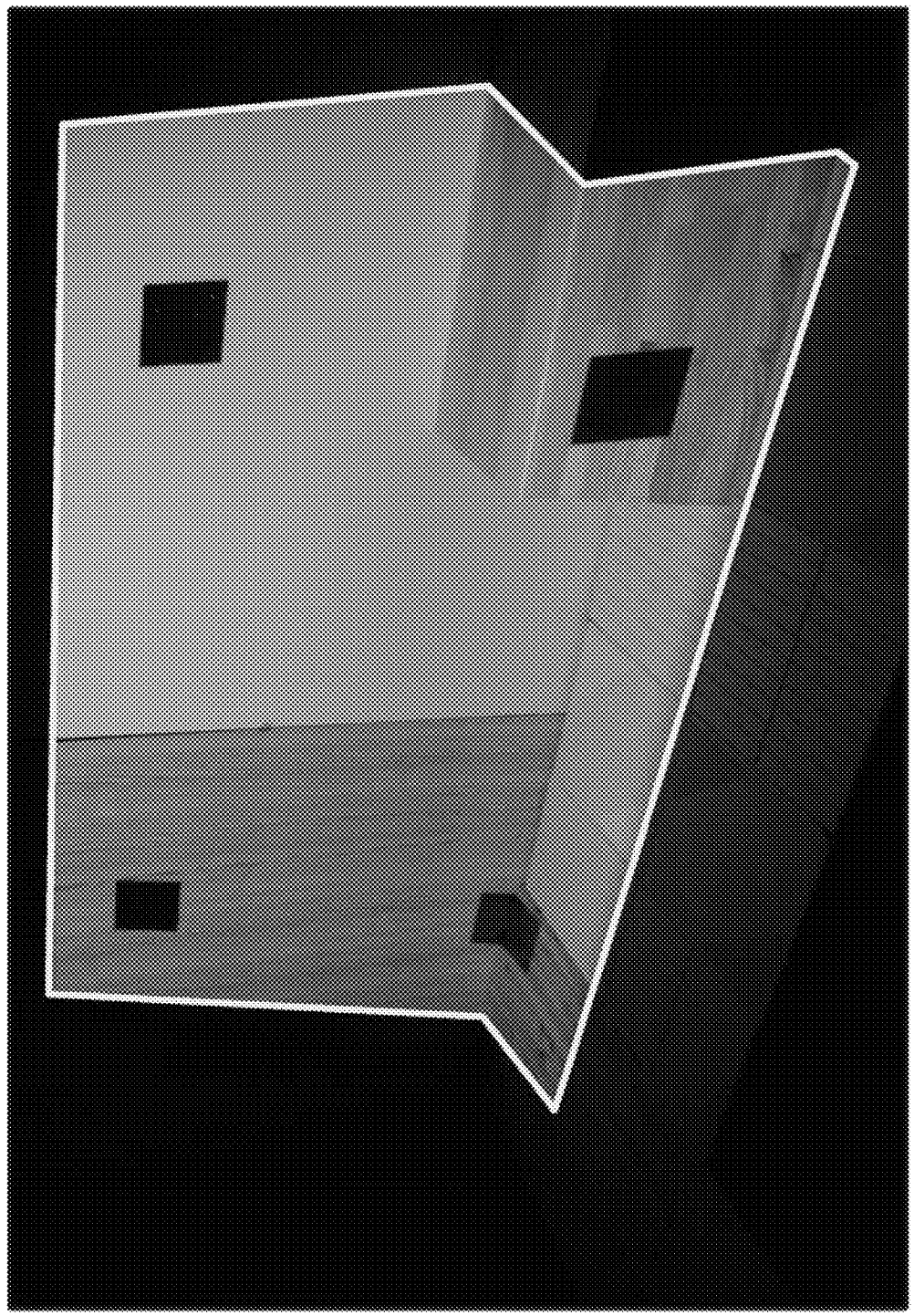
FIG. 6 shows a test image Img_t(1) for coarse adjustment projected onto the projection target shown in FIG. 5.

FIG. 5 shows an actual image of the projection target schematically shown in FIGS. 3 and 4. FIG. 6 shows a test image Img_t(1) for coarse adjustment projected onto the projection target shown in FIG. 5. More specifically, FIG. 6 shows an image obtained by capturing, at the imaging point Vp_tmp of the image capturing apparatus 200, the test image Img_t(1) for coarse adjustment projected from the projection point P_prj.

The image capturing apparatus 200 captures the test image Img_t(1) for coarse adjustment projected from the projection unit 3 to obtain a captured image Img_c (an image corresponding to one shown in FIG. 6).

The captured image Img_c obtained by the image capturing apparatus 200 is transmitted to the projector apparatus 100 via the third interface 21 of the image capturing apparatus 200.

In the projector apparatus 100, the captured image Img_c received from the image capturing apparatus 200 via the first interface 6 is transmitted to the viewpoint obtaining unit 131 for coarse adjustment of the coarse adjustment unit 13 of the projected image adjustment unit 1.

The viewpoint obtaining unit 131 for coarse adjustment compares the test image Img_t(1) (marker Image) projected from the projection unit 3 with the captured image Img_c captured by the image capturing apparatus 200 based on the projection point P_prj and the three-dimensional shape data 3D_data obtained from the three-dimensional shape data storage unit 5, thereby calculating the imaging point Vp_tmp. In this case, the viewpoint obtaining unit 131 for coarse adjustment specifies the positions of the four corner markers (black markers) in the test image Img_t(1) (marker image) and the captured image Img_c captured by the image capturing apparatus 200, thereby allowing for calculating the imaging point Vp_tmp.

It is sufficient for the viewpoint obtaining unit 131 for coarse adjustment to specify the approximate position of the imaging point Vp_tmp; accordingly, performing processing of specifying the positions of the four corner markers (black markers) in the image, as described above, allows for calculating (approximating) the imaging point Vp_tmp at a high speed.

A signal VP_tmp including information on the imaging point Vp_tmp (viewpoint Vp_tmp for coarse adjustment) calculated by the viewpoint obtaining unit 131 for coarse adjustment is transmitted from the viewpoint obtaining unit 131 for coarse adjustment to the coarse correction unit 132.

The coarse correction unit 132 reads the test image Img_t(2) for precise adjustment from the test image storage unit 2.

Figure 7:
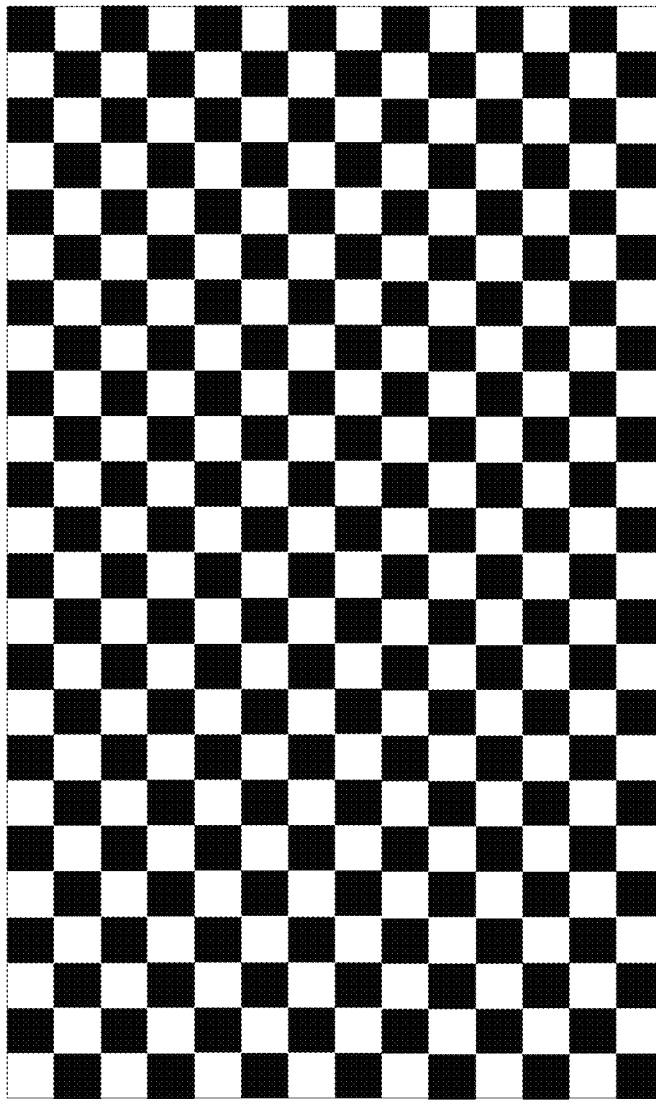
FIG. 7 shows an example of a test image for precise adjustment.

FIG. 7 shows an example of a test image for precise adjustment. As shown in FIG. 7, the test image for precise adjustment is an image in which a first lattice pattern which is a square pattern of a white background and a second lattice pattern which is a square pattern of a black background are alternately arranged in the horizontal and vertical directions. Using such a pattern image as a test image for precise adjustment allows for easily detecting geometric distortion in the projected image.

A case in which the test image shown in FIG. 7 as the test image Img_t(2) for precise adjustment will now be described.

The coarse correction unit 132 performs coarse correction processing on the test image Img_t(2) for precise adjustment based on the information P_prj on the projection point and the signal VP_tmp including information on the imaging point Vp_tmp (viewpoint Vp_tmp for coarse adjustment) to obtain an image signal Img_t_adj. More specifically, the coarse correction unit 132 performs coarse correction processing on the test image Img_t(2) such that no geometric distortion of the image exists when viewed from the imaging point Vp_tmp (viewpoint Vp_tmp for coarse adjustment), thereby obtaining the image signal Img_t_adj.

The image signal Img_t_adj obtained by the coarse correction unit 132 is transmitted to the second selector 14.

The second selector 14 then selects the terminal 1 in accordance with the selection signal sel1 to transmit the image signal Img_t_adj, as the image signal Dout, from the second selector 14 to the projection unit 3.

The projection unit 3 then projects the image signal Img_t_adj onto the projection target.

Figure 8:
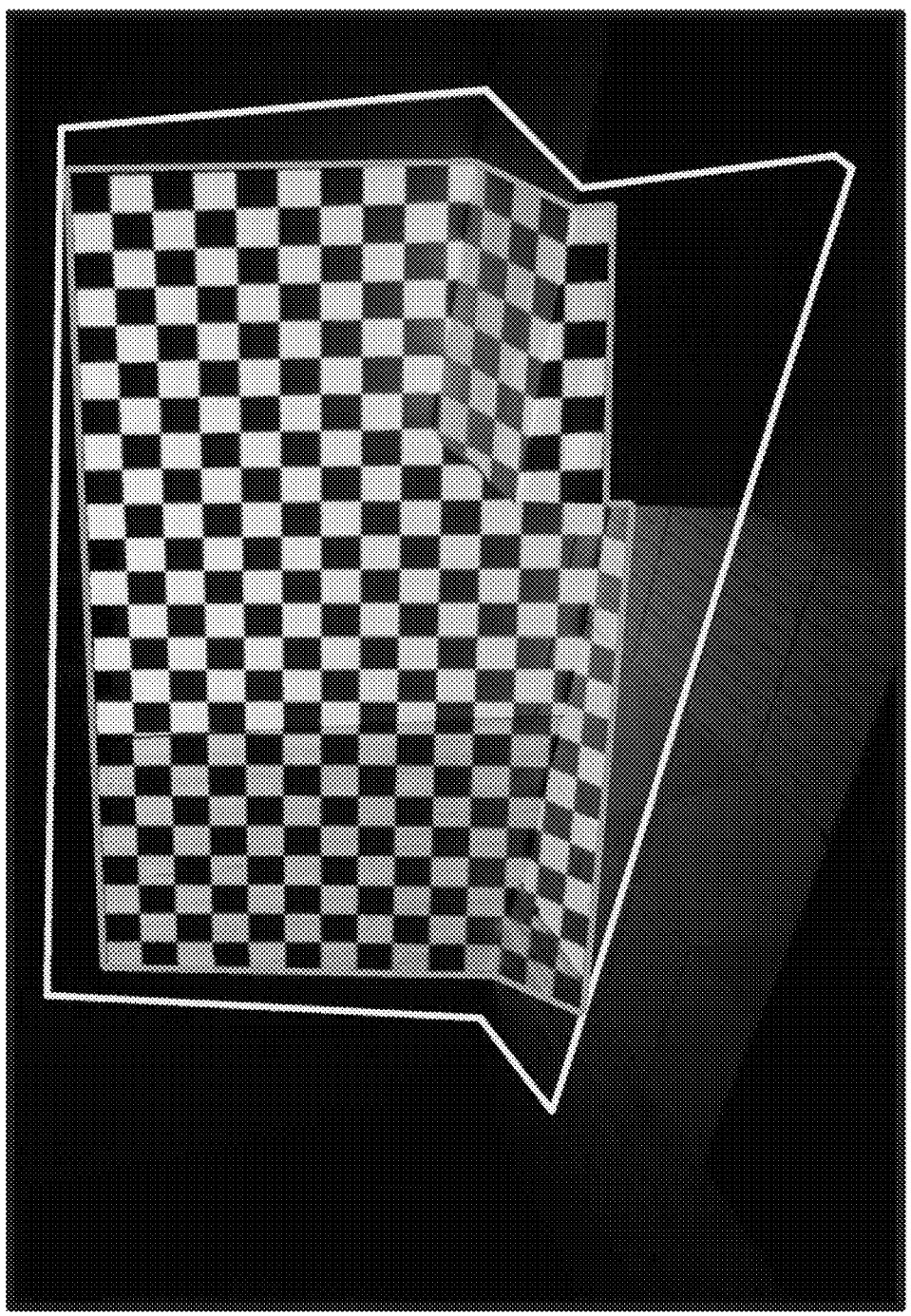
FIG. 8 shows an image of the test image Img_t(2) for precise adjustment projected onto the projection target in FIG. 5 as viewed from the viewpoint Vp.

FIG. 8 shows an image of the image Img_t_adj, which has been obtained by performing coarse correction processing on the test image Img_t(2) for precise adjustment projected onto the projection target in FIG. 5, as viewed from the viewpoint Vp.

As can be seen from FIG. 8, there are many distorted grid patterns in the image of FIG. 8 (image after coarse adjustment processing), and it can be ascertained that geometric distortion occurs in the image as viewed from the viewpoint Vp.

1.2.3 Precise Adjustment Processing

Next, precise adjustment processing will be described.

In the precise adjustment processing, the geometric image distortion occurring in the image after the coarse adjustment processing is corrected.

In a state, as shown in FIG. 8, in which the image after the coarse adjustment processing is projected, the user performs processing of shifting the coarse adjustment viewpoint Vp_tmp (imaging capturing point Vp_tmp), which is the viewpoint currently set in the projection system, to the real viewpoint of the user using the controller 300.

The controller 300 has buttons or the like (the buttons may be buttons on the touch panel or the like) with which a user can operate. Operating the button or the like by the user allows an instruction signal for shifting the viewpoint set in the projection system 1000 to be transmitted from the controller 300 to the projected image adjustment unit 1 of the projector apparatus 100 via the second interface 7.

The instruction signal from the controller 300 is transmitted from the second interface 7 to the precise adjustment signal generation unit 121 as the instruction signal Sig2.

Based on the instruction signal Sig2, the precise adjustment signal generation unit 121 generates a precise adjustment signal Adj for shifting the viewpoint Vp_tmp for coarse adjustment in accordance with the user's instruction. The precise adjustment signal generation unit 121 then transmits the generated precise adjustment signal Adj to the viewpoint obtaining unit 122 for precise adjustment.

Based on the signal VP_tmp including the information on the viewpoint Vp_tmp for coarse adjustment and the precise adjustment signal Adj, the viewpoint obtaining unit 122 for precise adjustment sets a point that is distant from the viewpoint Vp_tmp for coarse adjustment by a distance corresponding to the precise adjustment signal Adj to a new viewpoint and then generates a signal VP including the information on the newly set viewpoint to transmit it to the precise correction unit 123.

The first selector 11 selects the test image Img_t(3) for precise adjustment (the same image as the test image Img_t(2)) transmitted from the test image storage unit 2 in accordance with the mode signal mode to transmit it to the precise correction unit 123.

Note that while the user is adjusting the geometric image distortion of the projected image, a signal value of the mode signal mode is set to a signal value for selecting the terminal 0 in the first selector 11.

The precise correction unit 123 performs precise correction processing on the image signal D1 (test image Img_t(3) for precise adjustment) based on the mode signal mode, the information P_prj on the projection point of the projection unit 3, and the signal VP including viewpoint information to obtain the processed image signal D2. The precise correction unit 123 then transmits the obtained image signal D2 to the second selector 14. The second selector 14 selects the terminal 1 to transmit the image signal D2 after precise correction processing to the projection unit 3.

The projection unit 3 projects the image signal D2 after precise correction processing onto the projection target.

As described above, the user observes the projected state of the image signal D2 on which the precise correction processing has been performed, and further determines whether to perform precise correction processing.

More specifically, the operation (operation for shirting the viewpoint) using the controller 300 is repeatedly performed until the distortion (geometric distortion) of the lattice pattern of the test image disappears (or the distortion is reduced to a level equal to or less than a level that is determined to be a preferable level for the user) as viewed from the user's viewpoint Vp.

Every time the user performs the operation using the controller 300, the same processing (precise correction processing) as described above is performed in the projection system 1000.

Figure 9:
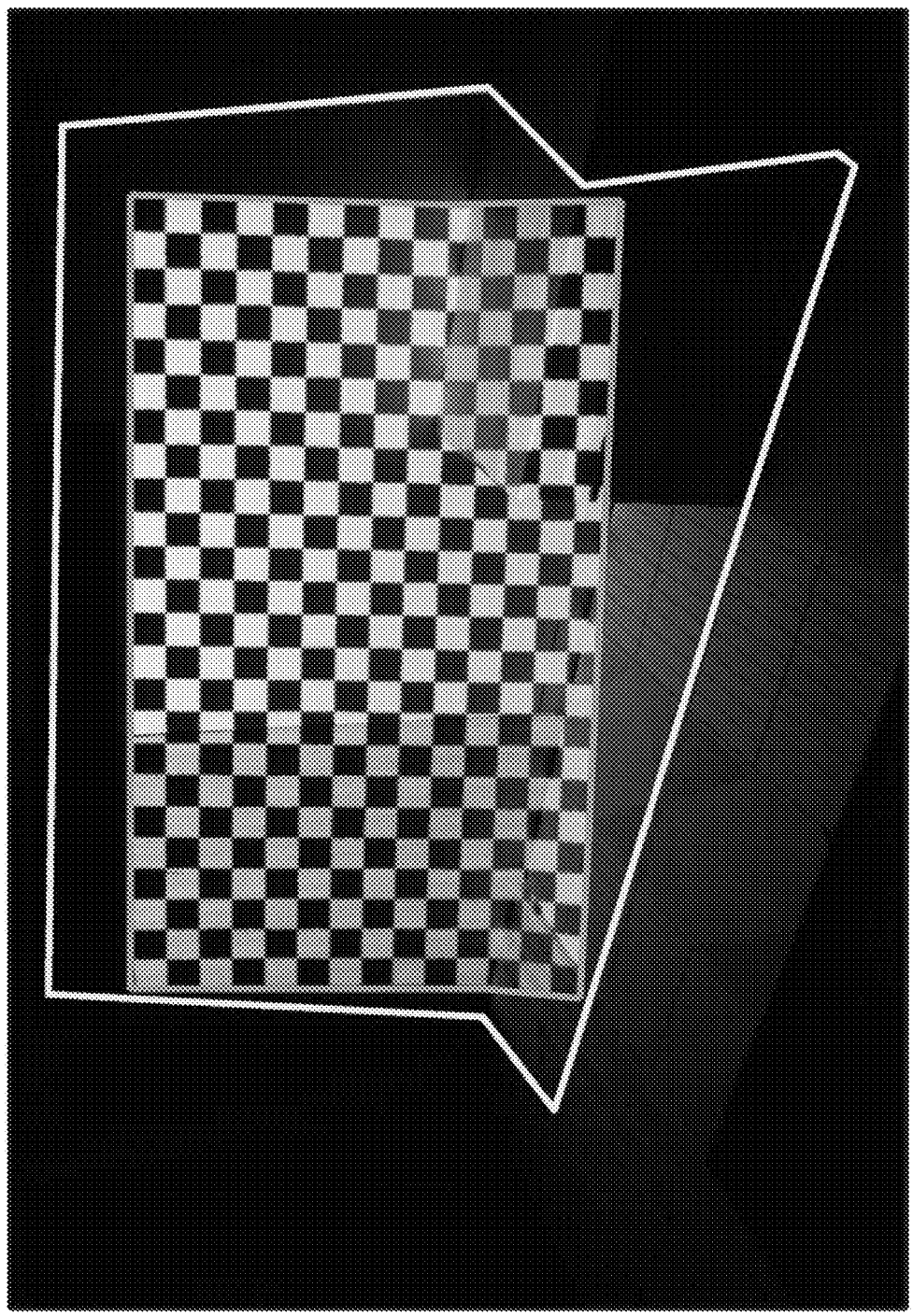
FIG. 9 shows an image of a test image Img_t(3) (precise correction processed image) projected onto the projection target in FIG. 5 as viewed from the viewpoint Vp.

FIG. 9 shows the projection state of the test image Img_t(3) for precise adjustment after the precise correction processing is performed in this way.

FIG. 9 shows an image of the test image Img_t(3) (precise correction processed image) projected onto the projection target in FIG. 5 as viewed from the viewpoint Vp.

As can be seen from FIG. 9, there is little distortion (little geometric distortion) of the lattice pattern of the test image Img_t(3) for precise adjustment, and the projected image is in a good state (a state in which little geometric image distortion exists).

Note that the user operates with the controller 300 while determining whether the shape of the lattice pattern of the test image for precise adjustment is close to a square, thereby allowing the precise adjustment processing to be performed in the projection system 1000. In other words, the user only needs to operate with the controller 300 such that the shape of the lattice pattern becomes close to a square; thus, there is no need to perform, in the projection system 1000, complicated processing in which the viewpoint is shifted using complicated data in consideration of the current settings of the three-dimensional coordinates of the viewpoint, the directions of the X-, Y-, and Z-axes, or the like.

After the precise adjustment processing is completed as described above, the user performs an operation of switching the mode, for example, using the controller 300 such that the image Din inputted into the projector apparatus 100 is displayed. This causes the projector apparatus 100 to display the image Din that has been inputted into the projector apparatus 100.

In this case, the first selector 11 selects the terminal 1 in accordance with the mode signal mode to transmit the image signal Din, as the image D1, to the precise correction unit 123. The precise correction unit 123 performs the same correction processing as one performed when the precise adjustment processing was completed to obtain the image signal D2 after correction processing. The precise correction unit 123 then transmits the obtained signal to the second selector 14. The second selector selects the terminal 1 to transmit the image signal D2 after correction processing to the projection unit 3. The projection unit 3 projects the image signal D2 (=Dout) after correction processing onto the projection target. The image projected from the projection unit 3 in this way is projected in the same state as when the precise adjustment processing was completed, and therefore the projected image is an image in which little geometric image distortion is perceivable as viewed from the user's viewpoint Vp.

Figure 10:
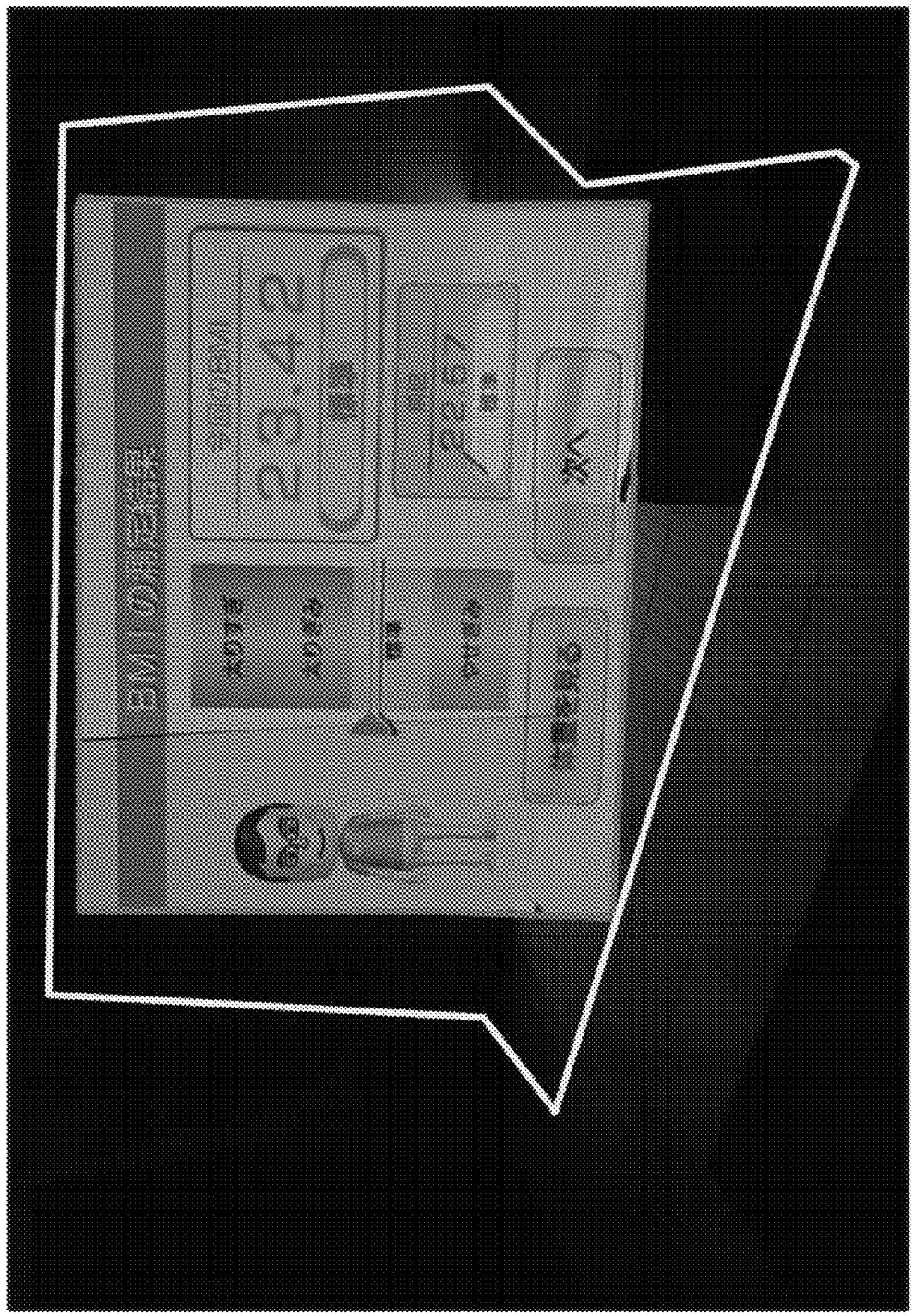
FIG. 10 shows an image including a scene, viewed from a user's viewpoint Vp, in which a general image is projected after the precise adjustment processing is completed.

FIG. 10 shows an image including a scene, viewed from a user's viewpoint Vp, in which a general image is projected after the precise adjustment processing is completed.

As can be seen from FIG. 10, there is little geometric image distortion; the projected image is in a good state.

As described above, the projection system 1000 sets any three-dimensional shape as a projection target, and performs two-phase adjustment, which includes (1) the coarse adjustment and (2) precise adjustment, thereby allowing the geometric distortion in the projected image to be corrected appropriately.

Furthermore, even when the user's viewpoint moves, the projection system 1000 projects a test image (a lattice-like image composed of a square lattice) adjusted by the coarse adjustment processing, and the precise adjustment processing using the controller 300 is performed such that geometric distortion in the projected test image (distortion (geometric distortion) of the square lattices included in the test image) is reduced. This enables the precise adjustment processing to be easily performed in an instinctively easy-to-understand manner. Thus, unlike the conventional techniques, the projection system 1000 does not need to perform complicated arithmetic processing, which the conventional techniques need, using a high-performance apparatus to precisely specify the user's viewpoint.

First Modification

Next, a first modification of the first embodiment will be described.

In this modification, the components that are the same as in the first embodiment are given the same reference numerals as those components, and will not be described in detail.

Figure 11:
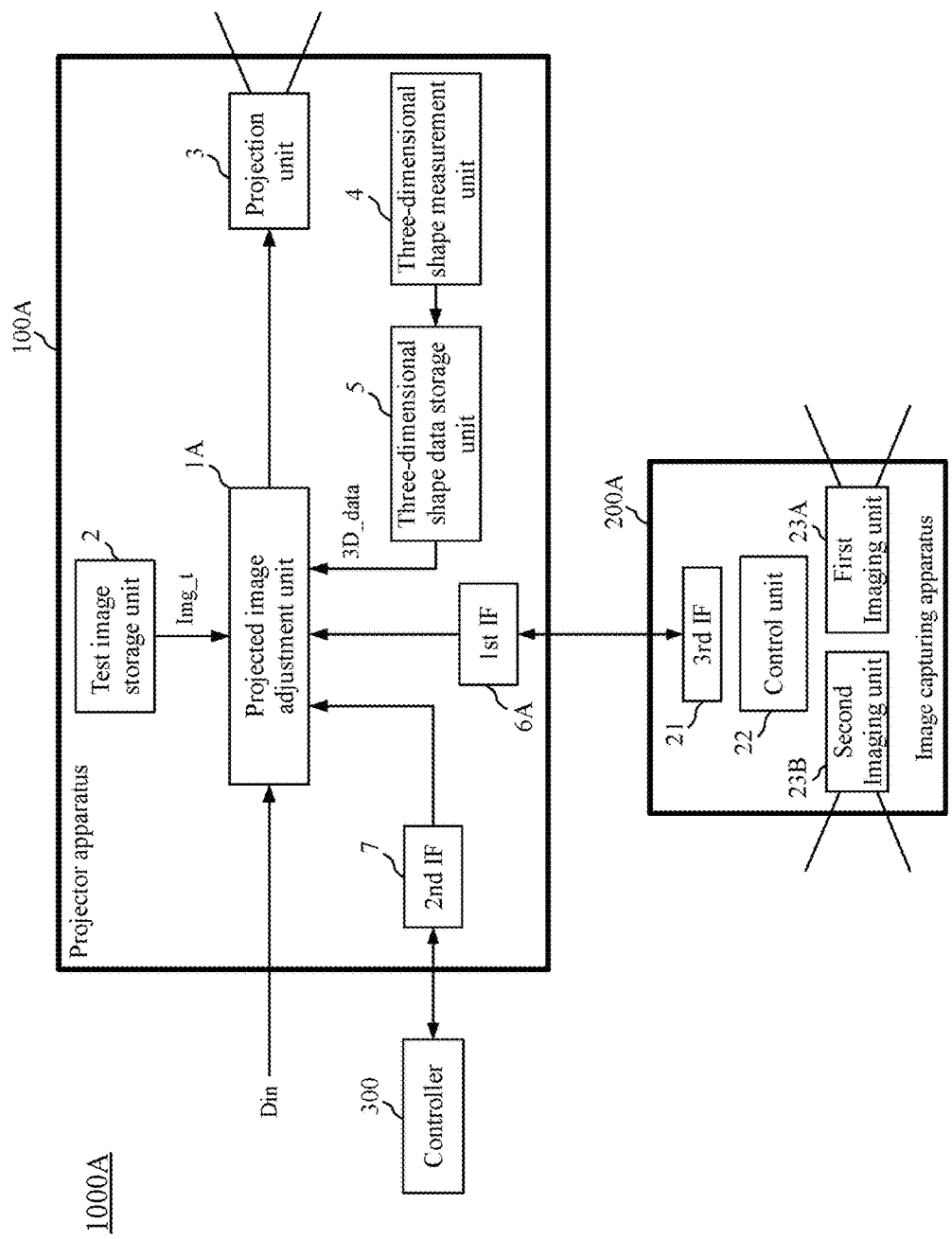
FIG. 11 is a schematic diagram showing the structure of a projection system 1000A according to a first modification of the first embodiment.

FIG. 11 is a schematic diagram showing the structure of a projection system 1000A according to the first modification of the first embodiment.

Figure 12:
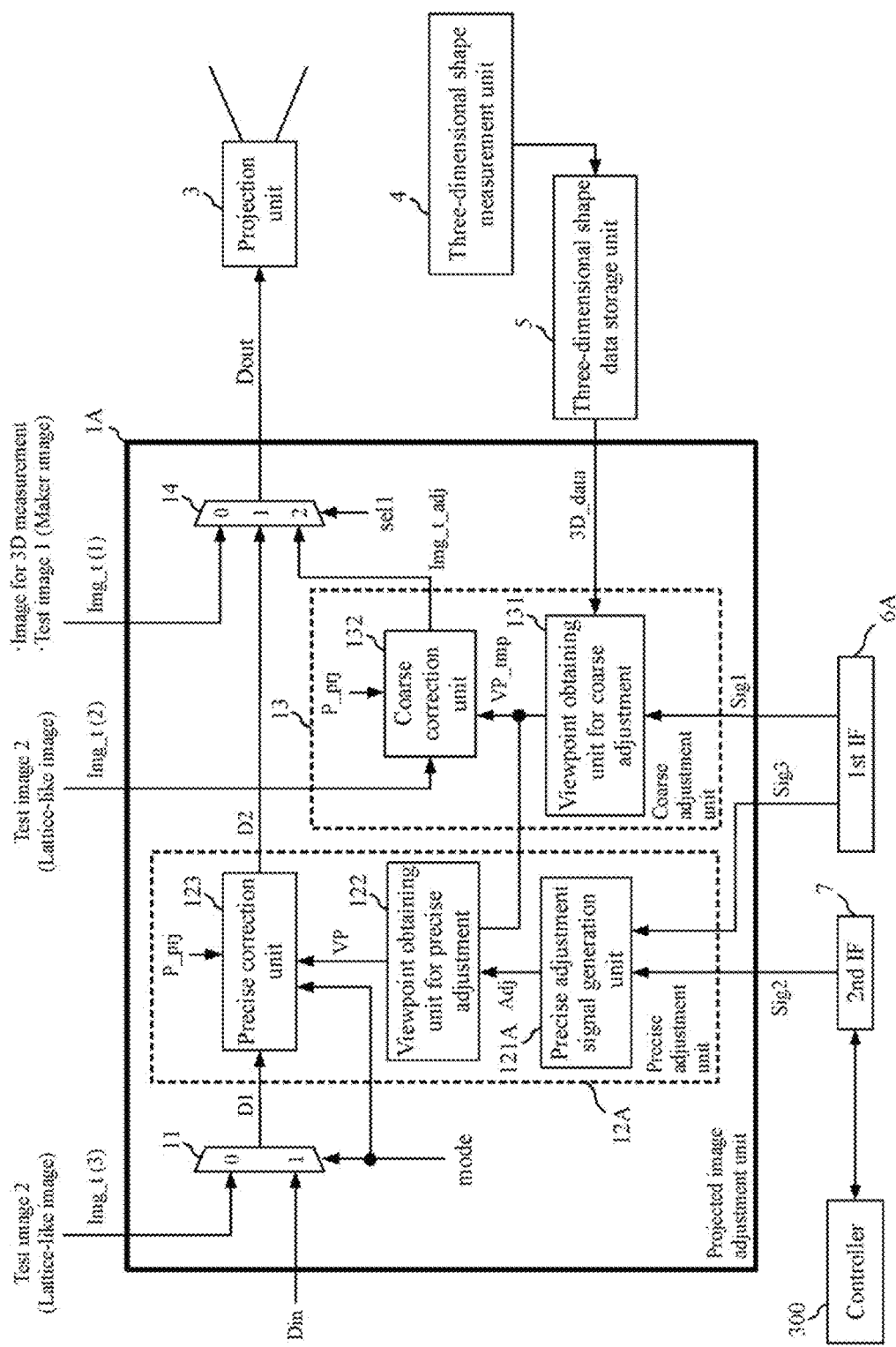
FIG. 12 is a schematic diagram showing the structure of a projected image adjustment unit 1A of a projector apparatus 100A of the projection system 1000A according to a first modification of the first embodiment.

FIG. 12 is a schematic diagram showing the structure of a projected image adjustment unit 1A of a projector apparatus 100A of a projection system 1000A of the first modification of the first embodiment.

The projection system 1000A according to this modification includes a projector apparatus 100A replacing the projector apparatus 100 of the projection system 1000 according to the first embodiment, and a image capturing apparatus 200A replacing the image capturing apparatus 200 of the projection system 1000 according to the first embodiment.

The projector apparatus 100A includes a precise adjustment unit 12A replacing the precise adjustment unit 12 of the projector apparatus 100 and a first interface 6A replacing the first interface 6 of the projector apparatus 100. The other structure of the projector apparatus 100A is the same as the structure of the projector apparatus 100.

The precise adjustment unit 12A includes a precise adjustment signal generation unit 121A replacing the precise adjustment signal generation unit 121 of the precise adjustment unit 12. The other structure of the precise adjustment unit 12A is the same as the structure of the precise adjustment unit 12.

The image capturing apparatus 200A includes a first imaging unit 23A replacing the imaging unit 23 of the image capturing apparatus 200 and additionally includes a second imaging unit 23B.

The first imaging unit 23A is similar to the imaging unit 23 of the first embodiment.

The second imaging unit 23B is an imaging unit for capturing an image of a user's face when imaging a projection target using the first imaging unit 23A.

The operation of the projection system 1000A of this modification with the above-described structure will now be described.

The projection system 1000A of the present modification captures an image of the user's face using the second imaging unit 23B of the image capturing apparatus 200A when the test image Img_t(1) for coarse adjustment is captured using the first imaging unit 23A of the image capturing apparatus 200A.

Subsequently, both eyes of the user are detected from the image of the user's face (hereinafter referred to as "face image") captured with the second imaging unit 23B. The control unit 22 of the image capturing apparatus 200A then calculates the coordinates of the center (viewpoint) of the both eyes of the user. More specifically, assuming that the distance between the both eyes of the user in the face image captured with the second imaging unit 23B corresponds to about 6 cm, the control unit 22 obtains information on the positional relationship between the imaging point of the second imaging unit 23B and the user's viewpoint based on the direction of the optical system of the second imaging unit 23B, the angle of view of the second imaging unit 23B or the like.

Furthermore, the positional relationship between the imaging point Vp_tmp of the first imaging unit 23A of the image capturing apparatus 200A and the imaging point of the second imaging unit 23B is known in the image capturing apparatus 200A; thus, the control unit 22 obtains information indicating the positional relationship between the imaging point Vp_tmp of the first imaging unit 23A and the user's viewpoint Vp (e.g., information on a vector from the start point positioned at the point Vp_tmp to the end point positioned at the point Vp).

The control unit 22 then transmits the information indicating the obtained positional relationship between the imaging point Vp_tmp of the first imaging unit 23A and the user's viewpoint Vp to the first interface 6A of the projector apparatus 100A via the third interface 21.

The first interface 6A of the projector apparatus 100A transmits the signal Sig3 including information indicating the positional relationship between the imaging point Vp_tmp obtained by the image capturing apparatus 200A and the user's viewpoint Vp to the precise adjustment signal generation unit 121A of the precise adjustment unit 12A The precise adjustment signal generation unit 121A of the precise adjustment unit 12A generates a precise adjustment signal Adj in the same manner as in the first embodiment based on the signal Sig3 transmitted from the first interface 6A and then transmits the generated precise adjustment signal Adj to the viewpoint obtaining unit 122 for precise adjustment.

Processing other than the above processing is the same as in the first embodiment.

As described above, in the projection system 1000A of this modification, the second imaging unit 23B captures a face image when the first imaging unit 23A captures the test image Img_t(1) for coarse adjustment, and then the projection system 1000A obtains, from the captured face image, information indicating the positional relationship between the imaging point Vp_tmp of the first imaging unit 23A and the user's viewpoint Vp. The projection system 1000A of this modification then performs precise adjustment processing using the information indicating the positional relationship between the imaging point Vp_tmp of the first imaging unit 23A obtained by the image capturing apparatus 200A and the user's viewpoint Vp. Thus, the projection system 1000A of this modification allows for more easily adjusting the geometric distortion of the projected image.

Second Modification

Next a second modification of the first embodiment will be described.

In this modification, the components that are the same as in the above embodiment are given the same reference numerals as those components, and will not be described in detail.

Figure 13:
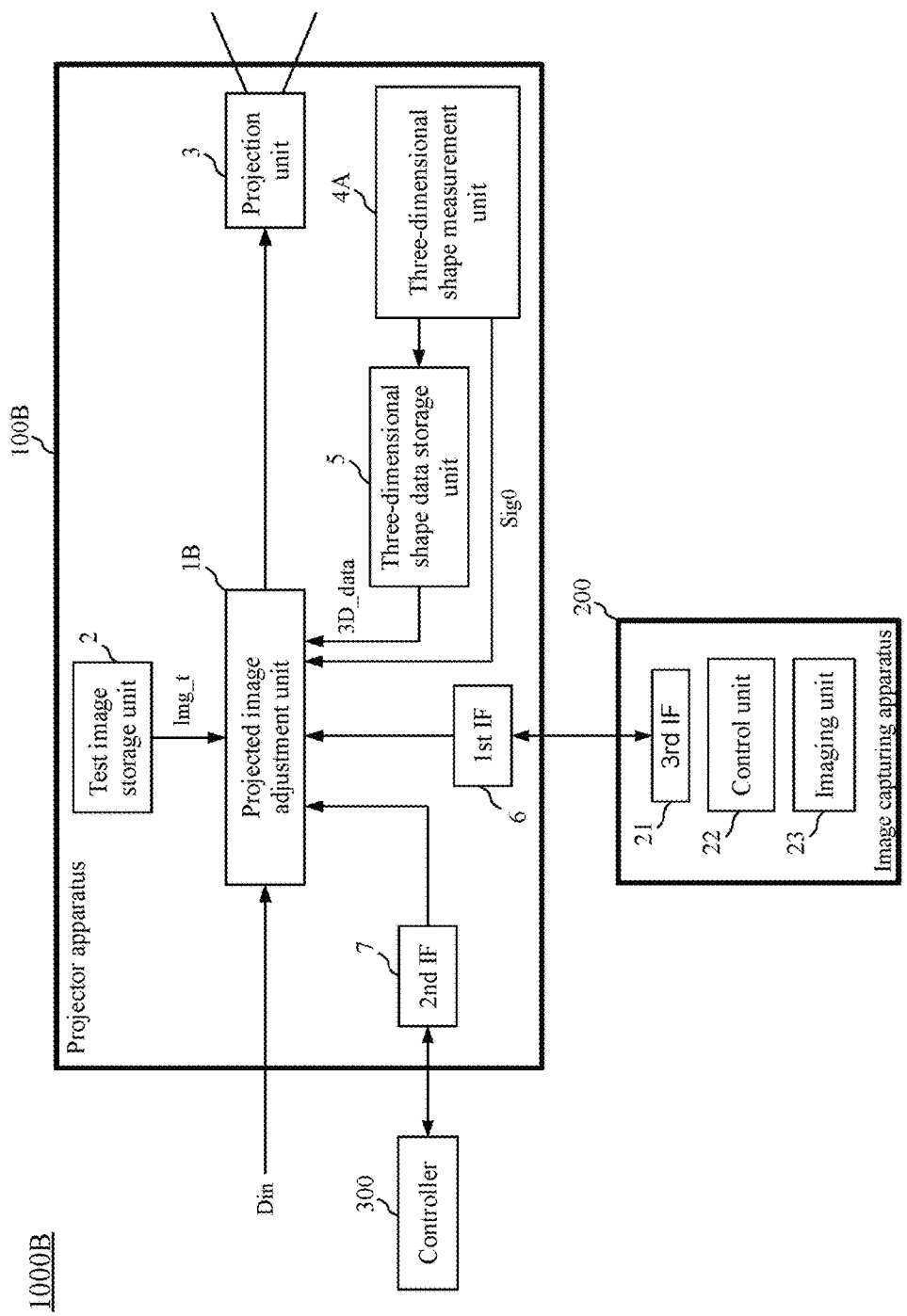
FIG. 13 is a schematic diagram showing the structure of a projection system 1000B according to a second modification of the first embodiment.

FIG. 13 is a schematic diagram showing the structure of a projection system 1000B according to the second modification of the first embodiment.

Figure 14:
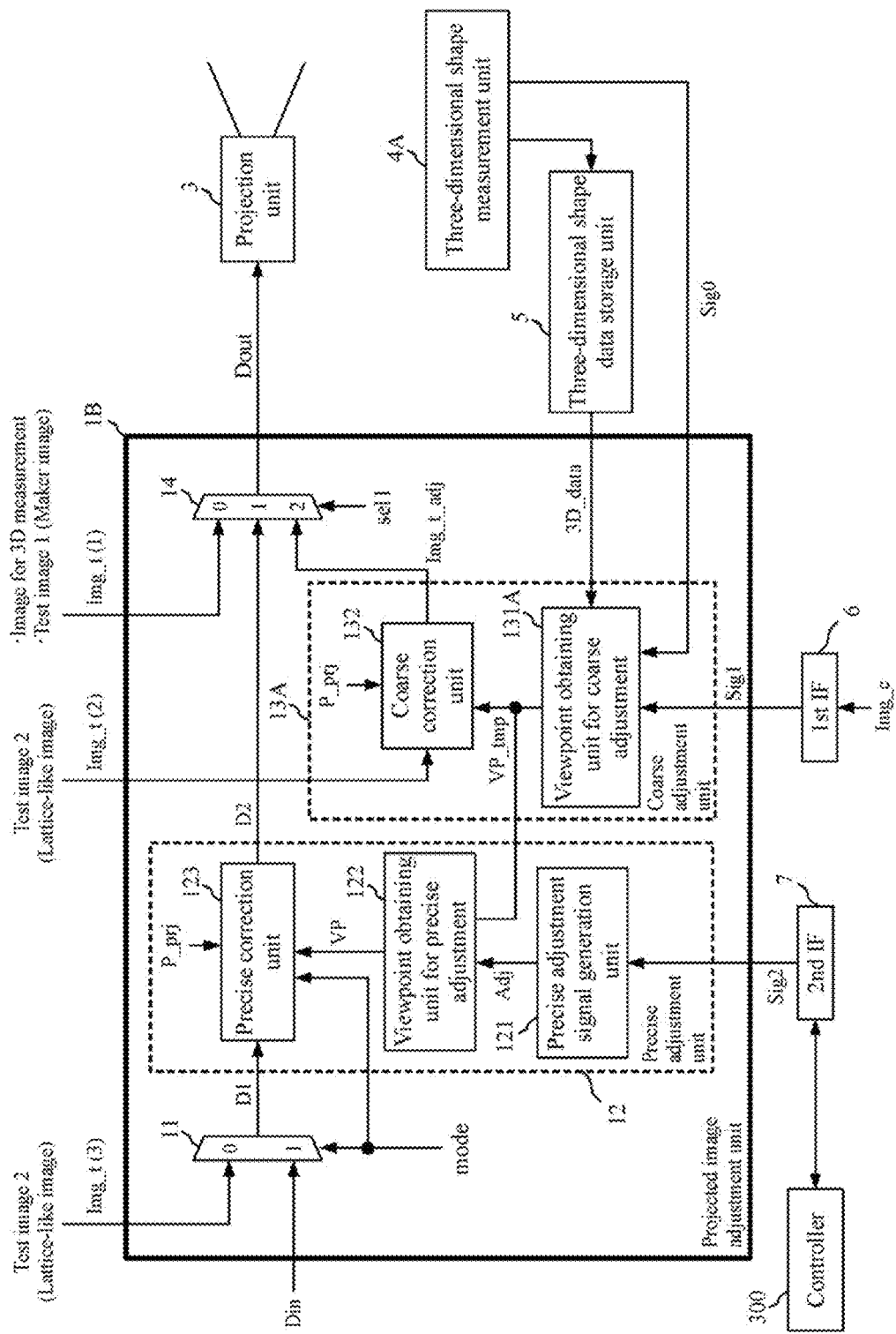
FIG. 14 is a schematic diagram showing the structure of a projected image adjustment unit 1B of a projector apparatus 100B of the projection system 1000B according to a second modification of the first embodiment.

FIG. 14 is a schematic diagram showing the structure of a projected image adjustment unit 1B of a projector apparatus 100B of a projection system 1000B according to the second modification of the first embodiment.

The projection system 1000B of the second modification includes projector apparatus 100B replacing the projector apparatus 100 of the first embodiment.

The projector apparatus 100B includes a projected image adjustment unit 1B replacing the projected image adjustment unit 1 and a three-dimensional shape measurement unit 4A replacing the three-dimensional shape measurement unit 4. The other structure of the projector apparatus 100B is the same as the structure of the projector apparatus 100.

As shown in FIG. 14, the projected image adjustment unit 1B includes a coarse adjustment unit 13A replacing the coarse adjustment unit 13 of the projected image adjustment unit 1.

The coarse adjustment unit 13A includes a viewpoint obtaining unit 131A for coarse adjustment replacing the viewpoint obtaining unit 131 for coarse adjustment of the coarse adjustment unit 13.

The viewpoint obtaining unit 131A for coarse adjustment receives a signal Sig0 transmitted from the three-dimensional shape measurement unit 4A and the three-dimensional shape data 3D_data transmitted from the three-dimensional shape data storage unit 5. The coarse adjustment unit 13A also receives the signal Sig1 (=the image signal Img_c) transmitted from the first interface 6.

The three-dimensional shape measurement unit 4A includes a camera (imaging unit), and is able to capture an image projected by the projection unit 3 using the camera. The three-dimensional shape measurement unit 4A transmits the captured image (image signal) as the signal Sig0 to the viewpoint obtaining unit 131A for coarse adjustment.

The operation of the projection system 1000B of the present modification with the above-described structure will now be described. The components in the present modification that are the same as the components described in the above embodiment will not be described in detail.

Before performing coarse adjustment processing, in the projection system 1000B of the present modification, the test image Img_t(1) for coarse adjustment is projected by the projection unit 3 and the projected test image Img_t(1) for coarse adjustment is captured using the camera of the three-dimensional shape measurement unit 4A to obtain a captured image Img_msr.

The viewpoint obtaining unit 131A for coarse adjustment compares the test image Img_t(1) (maker image) projected from the projection unit 3 with the captured image Img_msr captured by the camera of the three-dimensional shape measurement unit 4A based on the projection point P_prj and the three-dimensional shape data 3D_data obtained from the three-dimensional shape data storage unit 5, thereby calculating the imaging point Vp_tmp of the camera of the three-dimensional shape measurement unit 4A. In this case, the viewpoint obtaining unit 131A for coarse adjustment specifies the positions of four markers (black markers) in the test image Img_t(1) (marker image) and the captured image Img_msr captured with the camera of the three-dimensional shape measurement unit 4A to calculate (approximate) the imaging point Vp_tmp.

The projection system 1000B of this modification performs the above processing before performing the coarse adjustment processing.

After performing the above processing, the projection system 1000B of this modification performs the coarse adjustment processing and precise adjustment processing in the same manner as in the first embodiment.

In a case where the imaging point of the camera of the three-dimensional shape measurement unit 4A is close to the imaging point of the image capturing apparatus 200, performing the above-described processing eliminates the need for performing the coarse adjustment processing. In other words, in the above case, the above processing can replace the coarse adjustment processing.

Third Modification

Next, a third modification of the first embodiment will be described.

In this modification, the components that are the same as in the above embodiment are given the same reference numerals as those components, and will not be described in detail.

Figure 15:
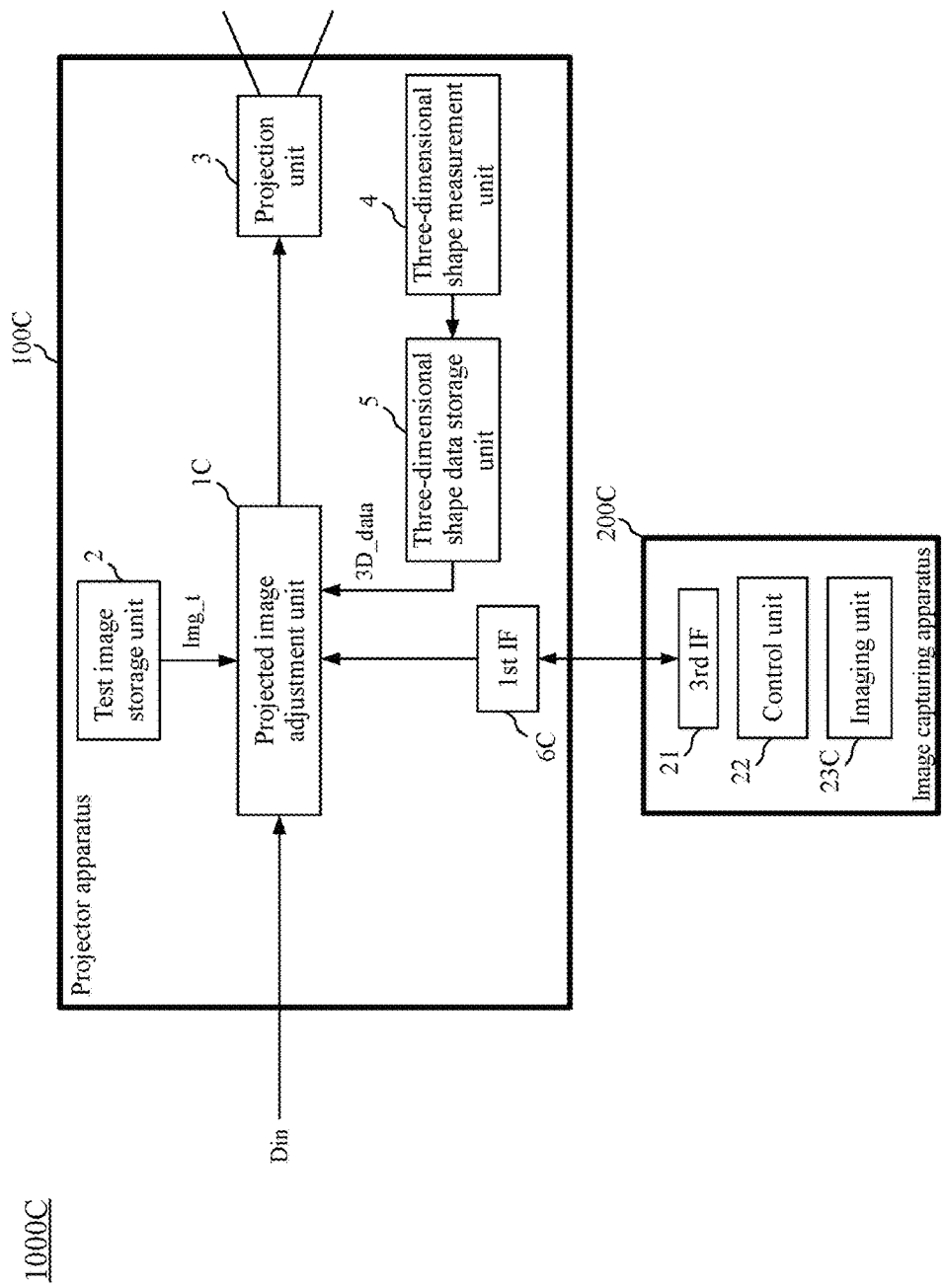
FIG. 15 is a schematic diagram showing the structure of a projection system 1000C according to a third modification of the first embodiment.

FIG. 15 is a schematic diagram showing the structure of a projection system 1000C according to the third modification of the first embodiment.

Figure 16:
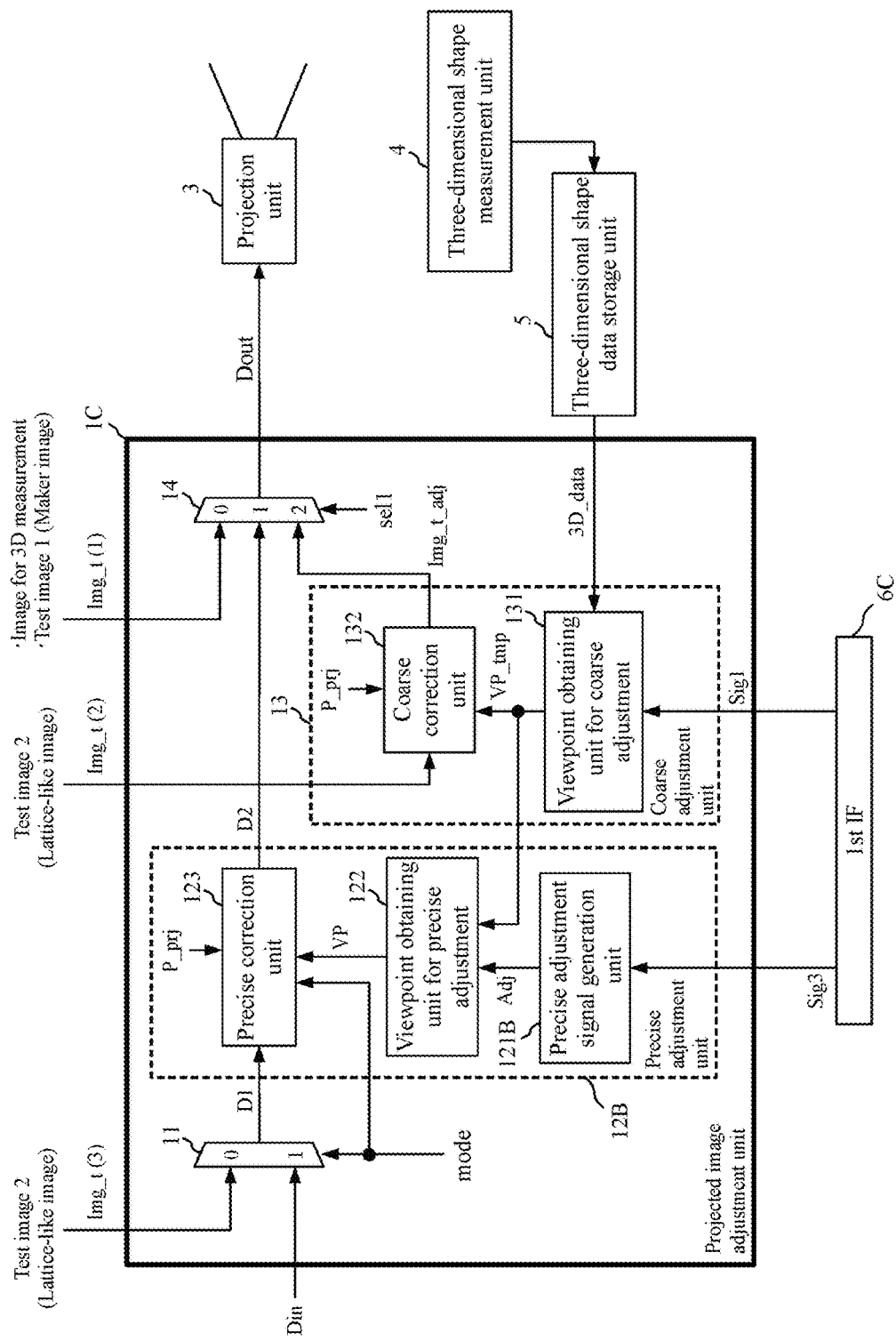
FIG. 16 is a schematic diagram showing the structure of a projected image adjustment unit 1C of a projector apparatus 100C of the projection system 1000C according to the third modification of the first embodiment.

FIG. 16 is a schematic diagram showing the structure of a projected image adjustment unit 1C of the projector apparatus 100C of the projection system 1000C according to the third modification of the first embodiment.

Figure 17:
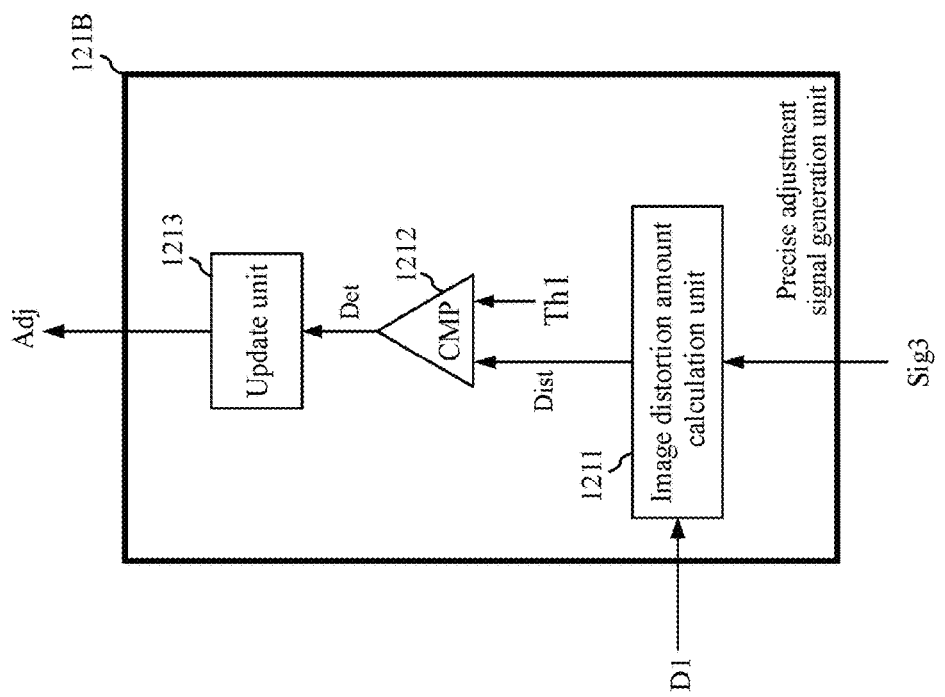
FIG. 17 is a schematic diagram showing the structure of a precise adjustment signal generation unit 121B according to the third modification of the first embodiment.

FIG. 17 is a schematic diagram showing the structure of a precise adjustment signal generation unit 121B according to the third modification of the first embodiment.

The projection system 1000C of the third modification includes a projector apparatus 100C replacing the projector apparatus 100 of the projection system 1000 of the first embodiment and an image capturing apparatus 200C replacing the image capturing apparatus 200 of the projection system 1000 of the first embodiment, and eliminates the controller 300 of the projection system 1000.

The projector apparatus 100C includes a projected image adjustment unit 1C replacing the projected image adjustment unit 1 of the projector apparatus 100 and a first interface 6C replacing the first interface 6 of the projector apparatus 100, and eliminates the second interface 7 of the projector apparatus 100. The other structure of the projector apparatus 100C is the same as the structure of the projector apparatus 100.

As shown in FIG. 16, the projected image adjustment unit 1C includes a precise adjustment unit 12B replacing the precise adjustment unit 12. The precise adjustment unit 12B includes a precise adjustment signal generation unit 121B replacing a precise adjustment signal generation unit 121 of the precise adjustment unit 12.

As shown in FIG. 17, the precise adjustment signal generation unit 121B includes an image distortion amount calculation unit 1211, a comparator 1212, and an update unit 1213.

The image distortion amount calculation unit 1211 receives the image signal D1 (test image Img_t(3) for precise adjustment) transmitted from the first selector 11 and the signal Sig3 (image Img_cs captured with the image capturing apparatus 200C) transmitted from the first interface 6C. The image distortion amount calculation unit 1211 compares the image D1 (the test image Img_t(3) for precise adjustment) with the image Img_cs (the signal Sig3) to calculate the image distortion amount, and then transmits a signal Dist indicating the calculated image distortion amount to the comparator 1212.

The comparator 1212 receives the signal Dist transmitted from the image distortion amount calculation unit 1211. The comparator 1212 compares the image distortion amount Dist obtained from the signal Dist with a predetermined threshold value Th1 and then transmits a signal indicating the comparison result to the update unit 1213 as a signal Det.

Note that when (1) Dist>Th1 is satisfied, the comparator 1212 set a signal value of the signal Det to "1"; when (2) Dist≤Th1 is satisfied, the comparator 1212 set a signal value of the signal Det to "0".

The update unit 1213 receives the signal Det transmitted from the comparator 1212. (1) When the signal value of the signal Det is "1", the update unit 1213 updates the precise adjustment signal Adj and transmits it to the viewpoint obtaining unit 122 for precise adjustment, whereas (1) when the signal value of the signal Det is "0", the update unit 1213 transmits the precise adjustment signal Adj without updating to the viewpoint obtaining unit 122 for precise adjustment (or does not transmit the precise adjustment signal Adj).

The first interface 6C is an interface between the projector apparatus 100C and the image capturing apparatus 200C. For example, an image (image signal) obtained by the image capturing apparatus 200C through image capturing can be inputted into the projector apparatus 100C via the first interface 6.

The image capturing apparatus 200C includes a imaging unit 23C replacing the imaging unit 23 of the image capturing apparatus 200.

The imaging unit 23C has a continuous shooting function (a function of shooting a plurality of captured images in a predetermined time period) or a function for capturing a video (moving images).

The operation of the projection system 1000C of this modified with the above-described structure will now be described.

In the projection system 1000C of this modification, the three-dimensional shape measurement processing and the coarse adjustment processing are the same as those in the first embodiment, so that the description thereof will be omitted.

In the projection system 1000C of this modification, the precise adjustment processing is achieved by automatic adjustment.

In the projection system 1000C, the image capturing apparatus 200C is fixed at the user's viewpoint (or near the viewpoint of the user), and then the coarsely adjusted image projected from the projection unit 3 is continuously captured (is captured through continuous shooting or video shooting for obtaining moving images). The image distortion amount of the image Img_cs obtained with the image capturing apparatus 200C is calculated by comparing the image Img_cs with the original image (the test image Img_t(2)) The precise adjustment processing is repeated until the calculated image distortion amount becomes equal to or less than a certain value Th1.

Specific processing will now be described with reference to FIG. 18.

Figure 18:
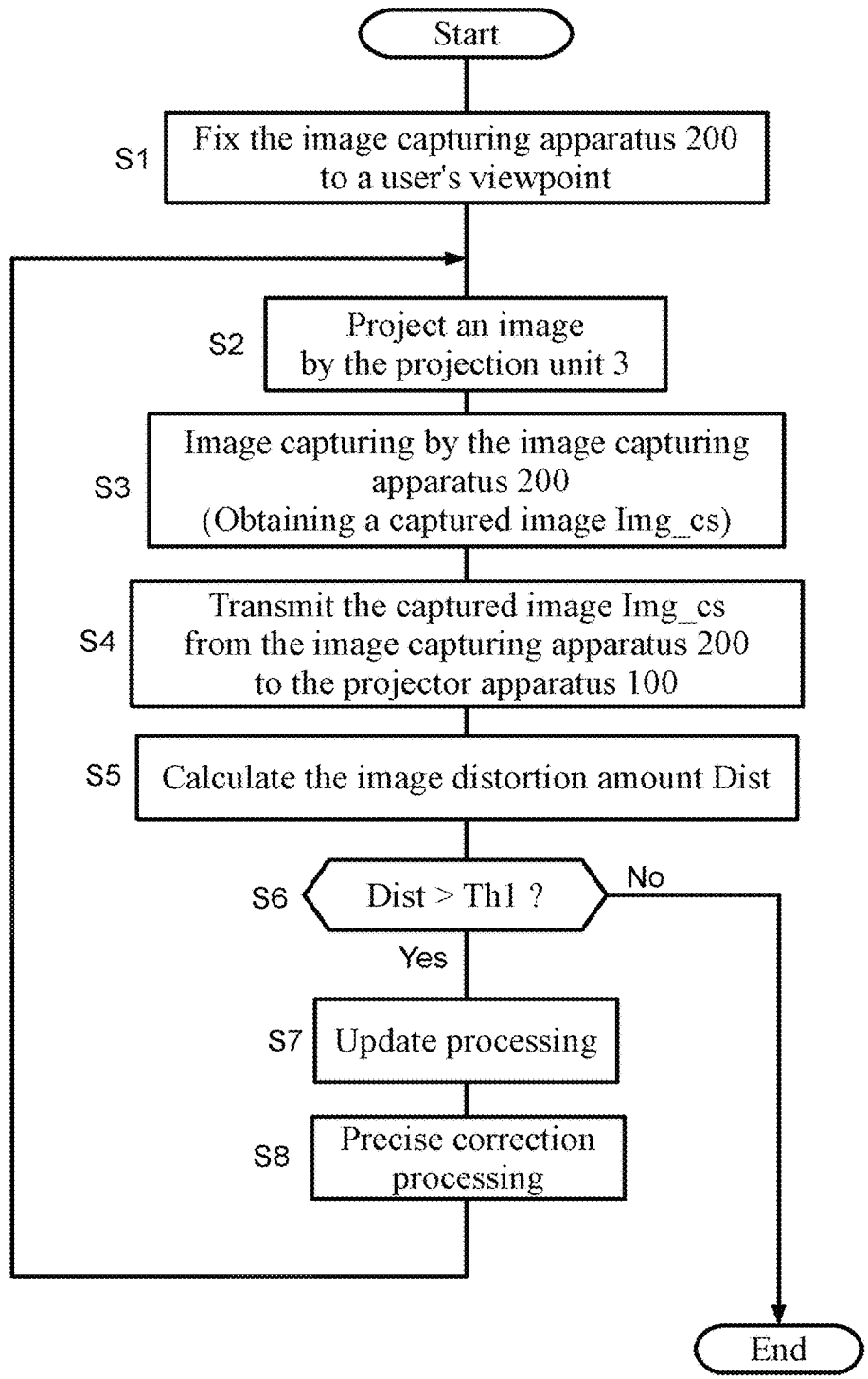
FIG. 18 is a flowchart of precise adjustment processing performed in the projection system 1000C according to the third modification of the first embodiment.

FIG. 18 is a flowchart of precise adjustment processing, which is achieved by automatic adjustment, performed in the projection system 1000C of the third modification.

The image capturing apparatus 200C is fixed at the viewpoint of the user (or near the viewpoint of the user) (step S1). The projection unit 3 projects the image after coarse adjustment processing (step S2). The image after coarse adjustment processing projected from the projection unit 3 is captured with the image capturing apparatus 200C to obtain a captured image Img_cs(step S3). The image capturing apparatus 200C transmits the captured image Img_cs to the projector apparatus 100 (step S4). More specifically, the image capturing apparatus 200C transmits the obtained captured image Img_cs to the first interface 6C of the projector apparatus 100C via the third interface 21.

The first interface 6C transmits the captured image Img_cs received from the image capturing apparatus 200C, as the signal Sig3, to the image distortion amount calculation unit 1211 of the precise adjustment signal generation unit 121B.

The image distortion amount calculation unit 1211 compares the image signal D1 (test image Img_t(3) for precise adjustment) transmitted from the first selector 11 with the signal Sig3 transmitted from the first interface 6C (image Img_cs captured with the image capturing apparatus 200C) to calculate an image distortion amount (step S5). The image distortion amount calculation unit 1211 then transmits the signal Dist indicating the calculated image distortion amount to the comparator 1212. As a method of calculating the amount of image distortion, for example, a method in which edge detection and pattern recognition processing are executed to calculate a sum of absolute values (or square values) of shift amounts from the position (pixel position) in the original image with a predetermined image pattern to the corresponding position (the corresponding pixel position) in the captured image, which is obtained by capturing the original image may be employed.

The comparator 1212 compares the image distortion amount Dist obtained from the signal Dist with a predetermined threshold value Th1 (step S6). (1) When Dist>Th1 is satisfied, the comparator 1212 sets the signal value of the signal Det to "1", whereas (2) when Dist≤Th1 is satisfied, the comparator 1212 sets the signal value of the signal Det to "0". The comparator 1212 then transmits the signal Det to the update unit 1213.

(1) The update unit 1213 updates the precise adjustment signal Adj when the signal value of the signal Det is "1". In this case, the update unit 1213 sets the signal value of the precise adjustment signal Adj to a value for shirting the viewpoint VP set by the viewpoint obtaining unit 122 for precise adjustment by a predetermined distance in a predetermined direction, and then transmits it to the viewpoint obtaining unit 122 for precise adjustment (step S7).

(2) The update unit 1213 does not update the precise adjustment signal Adj when the signal value of the signal Det is "0".

In this case, the update unit 1213 sets the signal value of the precise adjustment signal Adj to a currently set value, which has been set by the viewpoint obtaining unit 122 for precise adjustment, and then transmits it to the viewpoint obtaining unit 122 for precise adjustment (or may not transmit the precise adjustment signal Adj).

Based on the signal VP_tmp including information on the viewpoint Vp_tmp for coarse adjustment and the precise adjustment signal Adj, the viewpoint obtaining unit 122 for precise adjustment sets a point, which is distant from the viewpoint Vp_tmp for coarse adjustment by a distance corresponding to the precise adjustment signal Adj, to a new viewpoint to generate the signal VP including information on the new viewpoint, and then transmits it to the precise correction unit 123.

Note that when the signal value of the precise adjustment signal Adj transmitted from the update unit 1213 is identical to a value for maintaining the currently set viewpoint VP, which has been set by the viewpoint obtaining unit 122 for precise adjustment, the viewpoint obtaining unit 122 for precise adjustment transmits a control signal instructing to terminate the precise adjustment processing to the precise correction unit 123. When receiving the control signal instructing to terminate the precise adjustment processing, the precise correction unit 123 terminates the precise adjustment processing.

In the projection system 1000C of this modification, when the image distortion amount of the image Img_cs captured with the image capturing apparatus 200C is larger than a predetermined value, the above processing is repeated until the image distortion amount of the image Img_cs becomes equal to or less than a predetermined value. In other words, the processing from step S2 to step S8 in FIG. 18 is repeatedly executed. This allows the projection system 1000C of this modification to perform the precise adjustment processing automatically.

In the above-described precise adjustment processing by automatic adjustment, in order to transmit the captured image Img_cs from the image capturing apparatus 200C to the projector apparatus 100C in real time, data is transmitted and/or received by near field wireless communication (e.g., Bluetooth (registered trademark) or the like).

In the precise adjustment processing by automatic adjustment, when the user moves the position of the image capturing apparatus 200C (the position of the camera), the processing of the step 1 to the step 8 shown in FIG. 18 may be repeatedly executed.

Other Embodiments

In the above embodiment, the first interface, the second interface, and the third interface may be wireless communication interfaces or cable communication interfaces.

Each block of the projection system, the projector apparatus, the image capturing apparatus, and the controller described in the above embodiments may be formed using a single chip with a semiconductor device, such as an LSI (large-scale integration) device, or some or all of the blocks of the projection system, the projector apparatus, the image capturing apparatus, and/or the controller may be formed using a single chip.

Although LSI is used as the semiconductor device technology, the technology may be an integrated circuit (IC), a system LSI, a super LSI, or an ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

All or part of the processes performed by the functional blocks described in the above embodiments may be implemented using programs. All or part of the processes performed by the functional blocks described in the above embodiments may be implemented by a central processing unit (CPU) in a computer. The programs for these processes may be stored in a storage device, such as a hard disk or a ROM, and may be executed from the ROM or be read into a RAM and then executed.

The processes described in the above embodiments may be implemented by using either hardware or software (including use of an operating system (OS), middleware, or a predetermined library), or may be implemented using both software and hardware.

The processes described in the above embodiments may not be performed in the order specified in the above embodiments.

The order in which the processes are performed may be changed without departing from the scope and the spirit of the invention.

The present invention may also include a computer program enabling a computer to implement the method described in the above embodiments and a computer readable recording medium on which such a program is recorded. Examples of the computer readable recording medium include a flexible disk, a hard disk, a CD-ROM, an MO, a DVD, a DVD-ROM, a DVD-RAM, a large capacity DVD, a next-generation DVD, and a semiconductor memory.

The computer program may not be recorded on the recording medium but may be transmitted with an electric communication line, a radio or cable communication line, or a network such as the Internet.

The specific structures described in the above embodiments are mere examples of the present invention, and may be changed and modified variously without departing from the scope and the spirit of the invention.

APPENDIXES

The present invention may also be expressed in the following forms.

To solve the above problems, a first aspect of the invention provides a projection system that sets any shape as a projection target and projects an image onto the projection target such that geometric distortion of the projected image as viewed from a user's viewpoint is reduced. The projection system includes a projection unit, a three-dimensional shape measurement unit, an imaging unit, and a projected image adjustment unit.

The projection unit, which is located at a first position, is configured to project an image onto the projection target, and the projection unit projects a test image for first adjustment.

The three-dimensional shape measurement unit is configured to measure a three-dimensional shape of the projection target.

The imaging unit is configured to capture the test image for first adjustment projected from the projection unit to obtain a captured image for first adjustment The projected image adjustment unit is configured to perform first adjustment processing for correcting an image such that geometric image distortion viewed from the first imaging point, at which the captured image for first adjustment has been captured, is reduced, based on the three-dimensional shape data measured by the three-dimensional shape measurement unit and the captured image for first adjustment obtained by the imaging unit.

This allows the projection system to set any shape as a projection target and appropriately correct geometric distortion in the projected image through the first adjustment processing. In other words, unlike the conventional techniques, the projection system does not need to perform complicated arithmetic processing, which the conventional techniques need, using a high-performance apparatus to precisely specify the user's viewpoint.

In particular, in a case where the imaging point at which the image for first adjustment is captured coincides (or substantially matches) with the user's viewpoint, the geometric distortion of the projected image is appropriately corrected by a very simple processing.

A second aspect of the present invention provides the projection system of the first aspect of the present invention in which the projected image adjustment unit performs second adjustment processing for correcting an image such that geometric image distortion is reduced based on a state in which the image adjusted through the first adjustment processing is projected by the projection unit.

This allows the projection system to set any shape as the projection target and perform two-phase adjustment, which includes (1) the coarse adjustment and (2) precise adjustment, thus enabling the geometric distortion in the projected image to be corrected appropriately.

Furthermore, even when the user's viewpoint moves, the projection system projects an image (test image) adjusted by the first adjustment processing, and performs the second adjustment processing such that geometric distortion in the projected image is reduced. Thus, unlike the conventional techniques, the projection system does not need to perform complicated arithmetic processing, which the conventional techniques need, using a high-performance apparatus to precisely specify the user's viewpoint.

A third aspect of the present invention provides the projection system of the second aspect of the present invention further includes an input interface.

The projected image adjustment unit generates a projection test image for second adjustment that is obtained by performing the first adjustment processing on a test image for second adjustment.

The projection unit projects the projection test image for second adjustment onto the projection target.

The projected image adjustment unit generates a second adjustment signal based on an input from the input interface and performs the second adjustment processing based on the generated second adjustment signal.

Even when the user's viewpoint moves, the projection system projects the test image for second adjustment, which is adjusted by the first adjustment processing, and the second adjustment processing using the controller is performed such that geometric distortion in the projected test image is reduced. This enables the second adjustment processing to be easily performed in an instinctively easy-to-understand manner. Thus, unlike the conventional techniques, the projection system does not need to perform complicated arithmetic processing, which the conventional techniques need, using a high-performance apparatus to precisely specify the user's viewpoint.

A fourth aspect of the present invention provides the projection system of the third aspect of the present invention in which the test image for second adjustment is an identical image to the test image for first adjustment.

Thus, the projection system, processing can perform processing using one type of test image.

A fifth aspect of the present invention provides the projection system of one of the second to fourth aspects of the present invention in which the imaging unit includes a first camera configured to image the projection target and a second camera having an optical system at a position where an image of a photographer can be captured when an image of the projection target is captured using the first camera.

The imaging unit specifies the center point of both eyes of the photographer based on an image that is captured using the second camera and includes the both eyes of the photographer.

The projected image adjustment unit generates a second adjustment signal based on the user's viewpoint specified by the imaging unit and performs the second adjustment processing based on the generated second adjustment signal.

In the projection system, the second imaging unit captures a face image (an image including both eyes of the photographer) when the first camera of the imaging unit captures the test image for first adjustment, and then the projection system obtains, from the captured face image, information indicating the positional relationship between the imaging point of the first camera and the photographer's (user's) viewpoint. The projection system can perform the second adjustment processing using the information indicating the positional relationship between the imaging point of the first camera of the imaging unit and the photographer's (user's) viewpoint. Thus, the projection system allows for more easily adjusting the geometric distortion of the projected image.

A sixth aspect of the present invention provides the projection system of one of the second to fourth aspects of the present invention in which the projected image adjustment unit performs image generation processing to generate a projection test image for second adjustment obtained by performing the first adjustment processing on the test image for second adjustment.

The projection unit performs image projection processing that projects the projection test image for second adjustment onto the projection target.

The imaging unit performs captured image obtaining processing for obtaining a captured image for second adjustment by capturing the projection test image for second adjustment that is projected by the projection unit.

The projected image adjustment unit calculates an image distortion amount from the captured image for second adjustment obtained by the imaging unit and the projection test image for second adjustment, generates a second adjustment signal based on the calculated image distortion amount, and performs the second adjustment processing based on the generated second adjustment signal.

The projection system can perform the second adjustment processing using the second adjustment signal generated based on the image distortion amount of the captured image for second adjustment, which is captured by the imaging unit.

A seventh aspect of the present invention provides the projection system of the sixth aspect of the present invention in which the projected image adjustment unit determines whether the image distortion amount satisfies a predetermined condition. The image generation processing performed by the projected image adjustment unit, the image projection processing performed by the projection unit, the captured image obtaining processing performed by the imaging unit and the second adjustment processing performed by the projected image adjustment unit are repeatedly performed until the image distortion amount satisfies the predetermined condition.

This allows the projection system to perform the precise adjustment processing automatically.

An eighth aspect of the present invention provides the projection system of the seventh aspect of the present invention in which the projected image adjustment unit terminates the second adjustment processing when the image distortion amount is equal to or less than a predetermined value.

The projection system can perform the second adjustment processing using the second adjustment signal generated based on the image distortion amount of the captured image for the second adjustment, which is captured by the imaging unit. In the projection system, when the image distortion amount of the captured image for second adjustment is larger than a predetermined value, the second adjustment processing is repeated until the image distortion of the captured image for second adjustment becomes equal to or less than the predetermined value. This allows the projection system to perform the precise adjustment processing automatically.

A ninth aspect of the present invention provides the projection system of one of the sixth to eighth aspects of the present invention in which the test image for second adjustment is an image identical to the test image for first adjustment.

Thus, the projection system can perform processing using one type of test image.

A tenth aspect of the present invention provides the projection system of one of the third, fourth, and sixth to ninth aspects of the present invention in which the test image for second adjustment is an image having a lattice-like pattern composed of a plurality of square lattice patterns.

Even when the user's viewpoint moves, the projection system projects the test image (a lattice-like image composed of a square lattice) for second adjustment, which is adjusted by the first adjustment processing, and the second adjustment processing using the controller is performed such that geometric distortion in the projected test image (distortion (geometric distortion) of the square lattices included in the test image) is reduced. This enables the second adjustment processing to be easily performed in an instinctively easy-to-understand manner. Thus, unlike the conventional techniques, the projection system does not need to perform complicated arithmetic processing, which the conventional techniques need, using a high-performance apparatus to precisely specify the user's viewpoint.

An eleventh aspect of the present invention provides the projection system of the tenth aspect of the present invention in which the test image for second adjustment is an image having a lattice-like pattern in which a first lattice pattern with a first pattern and a second lattice pattern with a second pattern are alternately arranged in a first direction in the test image for second adjustment and a second direction orthogonal to the first direction in the test image for second adjustment in a state without geometric distortion.

Even when the user's viewpoint moves, the projection system projects the test image (a lattice-like image composed of a square lattice) for second adjustment, which is adjusted by the first adjustment processing, and the second adjustment processing using the controller is performed such that geometric distortion in the projected test image (distortion (geometric distortion) of the square lattices included in the test image) is reduced. This enables the second adjustment processing to be easily performed in an instinctively easy-to-understand manner. Thus, unlike the conventional techniques, the projection system does not need to perform complicated arithmetic processing, which the conventional techniques need, using a high-performance apparatus to precisely specify the user's viewpoint.

A twelfth aspect of the present invention provides the projection system of one of the first to eleventh aspects of the present invention in which the three-dimensional shape measurement unit is used for measuring the three-dimensional shape of the projection target and includes a camera for capturing the test image for first adjustment projected by the projection unit from a second imaging point that is a third position different from the first position.

The projected image adjustment unit performs initial adjustment processing that corrects an image such that the image distortion of the image is reduced as viewed from the second imaging point, at which the capturing image for first adjustment is captured, based on the three-dimensional shape data measured by the three-dimensional measurement unit and the captured image for first adjustment obtained using the camera of the three-dimensional measurement unit.

The projection system performs the initial adjustment processing, and thus, for example, when the position of the first imaging point and the position of the second imaging point are close to each other, the first adjustment processing can be substituted with the initial adjustment processing.

A thirteenth aspect of the present invention provides the projection system of one of the first to twelfth aspects of the present invention in which the imaging unit sets a position that is included in a predetermined sized space including a user's viewpoint position to the first imaging point, and captures, from the first imaging point, the test image for first adjustment that is projected by the projection unit.

This allows the viewpoint position of the user or the vicinity thereof to be set to the first imaging point.

Note that "a predetermined sized space including a user's viewpoint position" is, for example, a space defined by points whose distances from the user's viewpoint are equal to or less than 1 m, preferably a space defined by points whose distances from the user's viewpoint are equal to or less than 50 cm, or more preferably a space defined by points whose distances from the user's viewpoint are equal to or less than 10 cm.

A fourteenth aspect of the present invention provides a projector apparatus used in the projection system according to one of the first to thirteenth aspects. The projector apparatus includes the projection unit and the projected image adjustment unit.

This achieves the projector apparatus used in the projection system according to one of the first to tenth aspects.

A fifteenth aspect of the present invention provides an image capturing apparatus used in the projection system according to one of the first to thirteenth aspects. The image capturing apparatus includes the imaging unit.

This achieves the image capturing apparatus used in the projection system according to one of the first to thirteenth aspects.

A sixteenth aspect of the invention provides a projection method that sets any shape as a projection target and projects an image onto the projection target such that geometric distortion of the projected image as viewed from a user's viewpoint is reduced. The projection method includes a projection step, a three-dimensional shape measurement step, an imaging step, and a projected image adjustment step.

The projection step is configured to project a test image for first adjustment from a first position.

The three-dimensional shape measurement step is configured to measure a three-dimensional shape of the projection target.

The imaging step is configured to capture the test image for first adjustment projected by the projection step from a first imaging point, which is a second position different from the first position to obtain a captured image for first adjustment.

The projected image adjustment step is configured to perform first adjustment processing for correcting an image such that geometric image distortion viewed from the first imaging point, at which the captured image for first adjustment has been captured, is reduced, based on the three-dimensional shape data measured by the three-dimensional shape measuring step and the captured image for first adjustment obtained by the imaging step.

This achieves a projection method having the same advantageous effects as the projection system of the first aspect of the present invention.

A seventeenth aspect of the present invention provides the program of the sixteenth aspect of the present invention in which the projected image adjustment step includes performing a second adjustment processing for correcting an image such that geometric image distortion is reduced based on a state in which the image adjusted through the first adjustment processing is projected by the projection step.

This achieves a projection method having the same advantageous effects as the projection system of the second aspect of the present invention.

REFERENCE SIGNS LIST 1000, 1000A, 1000B, 1000C projection system
100, 100A projector apparatus
1, 1A, 1B, 1C projected image adjustment unit
2 test image storage unit
3 projection unit
4, 4A three-dimensional shape measurement unit
5 three-dimensional shape data storage unit
6 first interface
7 second interface
12, 12A, 12B precise adjustment unit
13, 13A coarse adjustment unit
200, 200A, 200C image capturing apparatus
23 imaging unit
23A first imaging unit (first camera)
23B first imaging unit (second camera)

What is claimed is:

1. A projection system that sets a shape as a projection target and projects an image onto the projection target such that geometric distortion of the projected image as viewed from a user's viewpoint is reduced, the projection system comprising:

three-dimensional shape measurement circuitry configured to measure a three-dimensional shape of the projection target;

projection circuitry, located at a first position, configured to project an image onto the projection target, the projection circuitry being configured to project a test image for first adjustment onto the projection target;

imaging circuitry configured to capture the test image for first adjustment, which is projected from the projection circuitry onto the projection target, from a first imaging point, which is a second position different from the first position, to obtain a captured image for first adjustment; and projected image adjustment circuitry configured to perform first adjustment processing for correcting an image such that geometric image distortion viewed from the first imaging point, at which the captured image for first adjustment has been captured, is reduced, based on the three-dimensional shape data measured by the three-dimensional shape measurement circuitry and the captured image for first adjustment obtained by the imaging circuitry, and wherein the first adjustment processing includes calculating the first imaging point based on the three-dimensional shape data measured by the three-dimensional shape measurement circuitry and the captured image for first adjustment obtained by the imaging circuitry, the projected image adjustment circuitry is configured to perform second adjustment processing after the first adjustment processing, the second adjustment processing includes:

generating a projection test image for second adjustment by correcting image distortion of a test image for second adjustment based on information on the projection point and information on the calculated imaging point, as viewed from the imaging point;

the projection circuitry is configured to project the projection test image for second adjustment onto the projection target;

the projected image adjustment circuitry is configured to generate a second adjustment signal based on an input instruction signal for shifting the view point calculated by the first adjustment processing to the user's viewpoint, to obtain a new viewpoint based on the second adjustment signal and to perform the second adjustment processing based on the new viewpoint and the projection test image.

2. The projection system according to claim 1, further comprising a controller and an input interface connecting the controller with the projected image adjustment circuitry, wherein the instruction signal is input by the user operating the controller after projecting the projection test image for second adjustment onto the projection target by the projection circuitry.

3. The projection system according to claim 1, wherein the test image for second adjustment that is to be used in performing the second adjustment processing is an identical image to the test image for first adjustment that is to be used in performing the first adjustment processing.

4. The projection system according to claim 1, wherein the projected image adjustment circuitry calculates an image distortion amount from the captured image for second adjustment obtained by the imaging circuitry and the projection test image for second adjustment, generates a second adjustment signal based on the calculated image distortion amount, and performs the second adjustment processing based on the generated second adjustment signal.

5. The projection system according to claim 4, wherein the projected image adjustment circuitry determines whether the image distortion amount satisfies a predetermined condition, and
the image generation processing performed by the projected image adjustment circuitry, the image projection processing performed by the projection circuitry, the captured image obtaining processing performed by the imaging circuitry and the second adjustment processing performed by the projected image adjustment circuitry are repeatedly performed until the image distortion amount satisfies the predetermined condition.

6. The projection system according to claim 5, wherein the projected image adjustment circuitry terminates the second adjustment processing when the image distortion amount is equal to or less than a predetermined value.

7. The projection system according to claim 1, wherein the test image for second adjustment is an image having a lattice-like pattern composed of a plurality of square lattice patterns.

8. The projection system according to claim 7, wherein the test image for second adjustment is an image having a lattice-like pattern in which a first lattice pattern with a first pattern and a second lattice pattern with a second pattern are alternately arranged in a first direction in the test image for second adjustment and a second direction orthogonal to the first direction in the test image for second adjustment in a state without geometric distortion.

9. The projection system according to claim 1, wherein the three-dimensional shape measurement circuitry is used for measuring the three-dimensional shape of the projection target and includes a camera for capturing the test image for first adjustment projected by the projection circuitry from a second imaging point that is a third position different from the first position, and
the projected image adjustment circuitry performs initial adjustment processing that corrects an image such that the image distortion of the image is reduced as viewed from the second imaging point, at which the capturing image for first adjustment is captured, based on the three-dimensional shape data measured by the three-dimensional measurement circuitry and the captured image for first adjustment obtained using the camera of the three-dimensional measurement circuitry.

10. The projection system according to claim 1, wherein the imaging circuitry sets a position that is included in a predetermined sized space including a user's viewpoint position to the first imaging point, and captures, from the first imaging point, the test image for first adjustment that is projected by the projection circuitry.

11. A projector apparatus used in the projection system according to claim 1, the projector apparatus comprising the projection circuitry and the projected image adjustment circuitry.

12. An image capturing apparatus used in the projection system according to claim 1, the image capturing apparatus comprising the imaging circuitry.

13. The projection system according to claim 1, wherein the imaging circuitry includes a first camera configured to image the projection target and a second camera having an optical system at a position where an image of a photographer can be captured when an image of the projection target is captured using the first camera,
the imaging circuitry specifies the center point of both eyes of the photographer based on an image that is captured using the second camera and includes the both eyes of the photographer, and
the projected image adjustment circuitry generates a second adjustment signal based on the user's viewpoint specified by the imaging circuitry and performs the second adjustment processing based on the generated second adjustment signal.

14. A projection method that sets a shape as a projection target and projects an image onto the projection target such that geometric distortion of the projected image as viewed from a user's viewpoint is reduced, the projection method comprising:
(a) measuring a three-dimensional shape of the projection target;
(b) projecting a test image for first adjustment from a first position onto the projection target;
(c) capturing the test image for first adjustment projected by the step (b) from a first imaging point onto the projection target, the first imaging position being a second position different from the first position, to obtain a captured image for first adjustment; and
(d) performing first adjustment processing for correcting an image such that geometric image distortion viewed from the first imaging point, at which the captured image for first adjustment has been captured, is reduced, based on the three-dimensional shape data measured by the step (a) and the captured image for first adjustment obtained by the step (c), and wherein
the first adjustment processing includes calculating the first imaging point based on the three-dimensional shape data measured by the step (a) and the captured image for first adjustment obtained by the step (c),
the step (d) includes performing second adjustment processing after the first adjustment processing,
the second adjustment processing includes:
generating a projection test image for second adjustment by correcting image distortion of a test image for second adjustment based on information on the projection point and information on the calculated imaging point, as viewed from the imaging point;

the step (b) includes projecting the projection test image for second adjustment onto the projection target;

the step (d) includes generating a second adjustment signal based on an input instruction signal for shifting the view point calculated by the first adjustment processing to the user's viewpoint, to obtain a new viewpoint based on the second adjustment signal and performing the second adjustment processing based on the new viewpoint and the projection test image.

* * * * *